United States Patent
Zhu et al.

(10) Patent No.: US 11,412,265 B2
(45) Date of Patent: *Aug. 9, 2022

(54) DECODING MULTI-LAYER IMAGES

(71) Applicant: DOLBY LABORATORIES LICENSING CORPORATION, San Francisco, CA (US)

(72) Inventors: Lihua Zhu, San Jose, CA (US); Jiancong Luo, Plainsboro, NJ (US); Peng Yin, Ithaca, NY (US); Jiheng Yang, Beijing (CN)

(73) Assignee: Dolby Laboratories Licensing Corporaton, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,763

(22) Filed: Nov. 3, 2020

(65) Prior Publication Data

US 2021/0120273 A1    Apr. 22, 2021

Related U.S. Application Data

(63) Continuation of application No. 16/394,987, filed on Apr. 25, 2019, now Pat. No. 10,863,203, which is a (Continued)

(51) Int. Cl.
*H04N 19/70* (2014.01)
*H04N 19/30* (2014.01)
(Continued)

(52) U.S. Cl.
CPC ............ *H04N 19/70* (2014.11); *H04N 19/30* (2014.11); *H04N 19/44* (2014.11); *H04N 19/597* (2014.11)

(58) Field of Classification Search
CPC ............................. H04N 19/70; H04N 19/30
See application file for complete search history.

(56) References Cited

U.S. PATENT DOCUMENTS 5,850,258 A    12/1998 Kang
6,501,797 B1    12/2002 Van Der Schaar
(Continued)

FOREIGN PATENT DOCUMENTS

CN    1258168    6/2000
CN    1666194    9/2005
(Continued)

OTHER PUBLICATIONS

Amon et al.: "File Format for Scalable Video Coding (SVC)", Joint Video Team (JVT) of ISO/IEC MPEG & ITU-T VCEG, 21.sup.st Mtg., Hangzhou, China, Oct. 20-27, 2006, Attachment to doc. JVT-U139, pp. 1-11.
(Continued)

*Primary Examiner* — Irfan Habib

(57) ABSTRACT

In an implementation, a supplemental sequence parameter set ("SPS") structure is provided that has its own network abstraction layer ("NAL") unit type and allows transmission of layer-dependent parameters for non-base layers in an SVC environment. The supplemental SPS structure also may be used for view information in an MVC environment. In a general aspect, a structure is provided that includes (1) information (1410) from an SPS NAL unit, the information describing a parameter for use in decoding a first-layer encoding of a sequence of images, and (2) information (1420) from a supplemental SPS NAL unit having a different structure than the SPS NAL unit, and the information from the supplemental SPS NAL unit describing a parameter for use in decoding a second-layer encoding of the sequence of images. Associated methods and apparatuses are provided on the encoder and decoder sides, as well as for the signal.

19 Claims, 10 Drawing Sheets

Related U.S. Application Data continuation of application No. 14/602,631, filed on Jan. 22, 2015, now abandoned, which is a continuation of application No. 14/075,528, filed on Nov. 8, 2013, now abandoned, which is a continuation of application No. 12/450,868, filed as application No. PCT/US2008/004530 on Apr. 7, 2008, now Pat. No. 8,619,871, which is a continuation-in-part of application No. 11/824,006, filed on Jun. 28, 2007, now abandoned.

(60) Provisional application No. 60/923,993, filed on Apr. 18, 2007.

(51) Int. Cl.
  *H04N 19/44* (2014.01)
  *H04N 19/597* (2014.01)

(56) References Cited

U.S. PATENT DOCUMENTS

| | | | |
|---|---|---|---|
| 6,744,816 | B1 | 6/2004 | Park |
| 7,724,818 | B2 | 5/2010 | Hannuksela et al. |
| 7,742,524 | B2 | 6/2010 | Jeon et al. |
| 7,742,532 | B2 | 6/2010 | Jeon et al. |
| 7,961,787 | B2 | 6/2011 | Tsai et al. |
| 2004/0006575 | A1 | 1/2004 | Visharam et al. |
| 2004/0218668 | A1 | 11/2004 | Hannuksela et al. |
| 2005/0180512 | A1 | 8/2005 | Narasimhan et al. |
| 2005/0254575 | A1 | 11/2005 | Hannuksela |
| 2005/0265449 | A1 | 12/2005 | Yoon |
| 2006/0050793 | A1 | 3/2006 | Wang et al. |
| 2006/0083308 | A1 | 4/2006 | Schwarz |
| 2006/0146734 | A1 | 7/2006 | Wenger et al. |
| 2006/0233247 | A1 | 10/2006 | Visharam et al. |
| 2006/0251169 | A1 | 11/2006 | Wang |
| 2007/0076799 | A1 | 4/2007 | Wan |
| 2007/0230564 | A1* | 10/2007 | Chen ............ H04N 21/2662 375/E7.199 |
| 2007/0230568 | A1 | 10/2007 | Eleftheriadis et al. |
| 2007/0291837 | A1* | 12/2007 | Eleftheriadis ........ H04N 19/61 375/E7.126 |
| 2008/0095228 | A1* | 4/2008 | Hannuksela ......... H04N 19/70 375/240.01 |
| 2008/0232467 | A1* | 9/2008 | Iguchi ............... H04N 19/105 375/E7.243 |
| 2008/0298219 | A1* | 12/2008 | Yamagata ............. G11B 27/322 |
| 2008/0317124 | A1 | 12/2008 | Cho et al. |
| 2009/0003431 | A1 | 1/2009 | Zhu et al. |
| 2009/0060040 | A1* | 3/2009 | Jeon .................. H04N 19/187 375/E7.149 |
| 2010/0142613 | A1 | 6/2010 | Zhu |
| 2011/0002397 | A1* | 1/2011 | Wang .................. H04N 19/30 375/240.26 |

FOREIGN PATENT DOCUMENTS

| | | |
|---|---|---|
| EP | 1039680 | 9/2000 |
| EP | 1073891 | 2/2001 |
| EP | 1073891 | 8/2006 |
| KR | 10-2006-0105449 | 10/2006 |
| KR | 10-1393169 | 2/2010 |
| RU | 2201654 | 3/2003 |
| RU | 2326505 | 6/2008 |
| TW | 200641726 | 12/2006 |
| TW | 200703270 | 1/2007 |
| TW | 200708109 | 2/2007 |
| WO | 99/33273 | 7/1999 |
| WO | 99/54728 | 10/1999 |
| WO | 2005/112464 | 11/2005 |
| WO | 2006/108917 | 10/2006 |
| WO | 2006/126842 | 11/2006 |
| WO | 2006/134110 | 12/2006 |
| WO | 2007/006704 | 1/2007 |
| WO | 2007/046957 | 4/2007 |
| WO | 2007/064082 | 6/2007 |
| WO | 2007/112384 | 10/2007 |
| WO | 2008/128388 | 10/2008 |
| WO | 2009/005627 | 1/2009 |

OTHER PUBLICATIONS

Detlev Marpe, et al, "The H.264/MPEG4 Advanced Video Coding Standard and its Applications", IEEE Communications Magazine, Aug. 2006, pp. 134-143, Standard Report.

Gary J. Sullivan, "On SVC high-level syntax and HRD", Joint Video Team (JVT) of ISO/IEC MPEG & ITU-T VCEG (ISO/IEC JTC1/SC29/WG11 and ITU-T SG16 Q.6) Document JVT-W125r1, Apr. 2007, pp. 1-10, San Jose, California.

Gary J. Sullivan, et al., "The H.264/AVC Advanced Video Coding Standard: Overview and Introduction to the Fidelity Range Extensions", Presented at the SPIE Conference on Applications of Digital Image Processing XXVII, Aug. 2004, pp. 1-22, Microsoft,Corporation, Fast VDO LLC, and Motorola Inc., BCS, Redmond, WA.

International Telecommunication Union, "Advanced Video Coding for Generic Audiovisual Services", ITU-T Telecommunication Standardization Sector of ITU, H.264, Series H: Audioviisual and Multimedia Systems, Infrastructure of audiovisual services—Coding of moving video, Mar. 2005, 343 pages, Geneva Switzerland.

International Telecommunication Union, "Advanced Video Coding for Generic Audiovisual Services", ITU-T Telecommunication Standardization Sector of ITU, H.264, Series H: Audiovisual and Multimedia Systems, Infrastructure of audiovisual services—Coding of moving video, May 2003, 282 pages, Geneva Switzerland.

International Telecommunication Union; ITU-T Telecommunication Standardization Sector of ITU, "Advanced video coding for generic audiovisual servies", Series H: Audiovisual and Multimedia Systems Infrastructure of audiovisual services—Coding of moving video, H.264, Nov. 2007, 564 pages.

Jeong-Hyu Yang, et al., "Comments on MVC High Level Syntax", Joint Video Team (JVT) of ISO/IEC MPEG & ITU-T VCEG (ISO/IEC JTC1/SC29/WG11 and ITU-T SG16 Q.6), JVT-Y061, Oct. 2007, pp. 1-7, Shenzhen, China.

Lihua Zhu, et al., "Supplemental Sequence Parameter Set for Scalable Video Coding or Multi-View Video Coding", Thomson, Joint Video Team (JVT) of ISO/IEC MPEG & ITU-T VCEG, doc, JVT-Y051, Oct. 16, 2007, pp. 1-7.

Peng Chen et al.: "A Network-Adaptive SVC Streaming Architecture," The 9.sup.th Int'l Conference on Advanced Communication Technology, IEEE, PI, Feb. 1, 2007, pp. 955-960.

Peng Chen, et al., "A Network-Adaptive SVC Streaming Architecture", The 9th Int'l Conference on Advanced Communication Technology, IEEE, P1, Feb. 2007, pp. 955-960.

Purvin Pandit, et al., "High Level Syntax Changes for MVC", Joint Video Team (JVT) of ISO/IEC MPEG & ITU-T VCEG (ISO/IEC JTC1/SC29/WG11 and ITU-T SG16 Q6), JVT-V054, Jan. 2006, pp. 1-10, Morocco.

Purvin Pandit, et al., "MVC High-Level Syntax for Random Access", ISO/IEC JTC1/SC29/WG11, M13715, Internationa Organisation for Standardisation, Jul. 2006, pp. 1-11, Klagenfurt, Austria.

Rathgen Thomas: Proposal for SVC File Format Specification; ISO/IECJTC1/SC2911/VG11; MPEG2005/M12345, Poznan, Jul. 2005.

Sullivan: "On SVC High Level Syntax and HRD," Microsoft, Joint Video Team (JVT) of ISO/IEC MPEG & ITU-T VCEG, doc.: JVT-W125, Apr. 19, 2007, pp. 1-7.

Sullivan: "On SVC High Level Syntax and HRD," Microsoft, Joint Video Team (JVT) of ISO/IEC MPEG & ITU-T VCEG, doc.: JVT-W125r1, Apr. 19, 2007, pp. 1-10.

Wenger et al.: "RTP Payload Format for H.264/SVC Scalable Video Coding," Journal of Zhejiang University Science A, International Applied Physics Engineering Journal, Springer, Berlin, DE, vol. 7, No. 5, May 1, 2006, pp. 657-667.

(56) References Cited

OTHER PUBLICATIONS

Wiegand et al., "Joint Draft 6 of SVC Amendment", JVT of ISO/IEC MPEG & ITU-T VCEG, Document: JVTS-201, 21st Meeting: Hangzhou, China, Oct. 20-27, 2006.

Wiegand et al., "Joint Draft 9 of SVC Amendment", JVT of ISO/IEC MPEG & ITU T VCEG, Document: JVTV-201, 22nd Meeting: Marrakech, Morocco, Jan. 13-19, 2007.

Wiegand et al.: "Joint Draft 9 of SVC Amendment," JVT-V201, Joint Video Team (JVT) of ISO/IEC MPEG & ITU-T VCEG, Marrakech, Morocco, Jan. 13-19, 2007.

Wiegand et al.: "Overview of the H.264/AVC Video Coding Standard," IEEE Transactions on Circuits and Systems for Video Technology, vol. 13, No. 7, Jul. 2003, pp. 560-576.

Zhu et al.: "Supplemental Sequence Parameter Set for Scalable Video Coding or Multi-View Video Coding," Thomson, Joint Video Team (JVT) of ISO/IEC MPEG & ITU-T VCEG, doc.: JVT-Y051, Oct. 16, 2007, pp. 1-7.

Zhu et al.: "SVC Hypothetical Reference Decoder," Thomson, Joint Video Team (JVT) of ISO/IEC MPEG & ITU-T VCEG, Marrakech, Morocco, Jan. 13-19, 2007, pp. 1-10.

Wenger et al. "RTP Payload Format for SVC Video", Network working Group, Mar. 5, 2007, 43 pages.

Wiegand et al "Joint Draft 8 of SVC Amendment", JVT of ISO/IEC MPEG & ITU-T VCEG, Document JVTU20th-21st meeting, Hangzhou, China, Oct. 20-27, 2006, 552 pages.

* cited by examiner

SCALABLE VIDEO ENCODED DATA STREAM

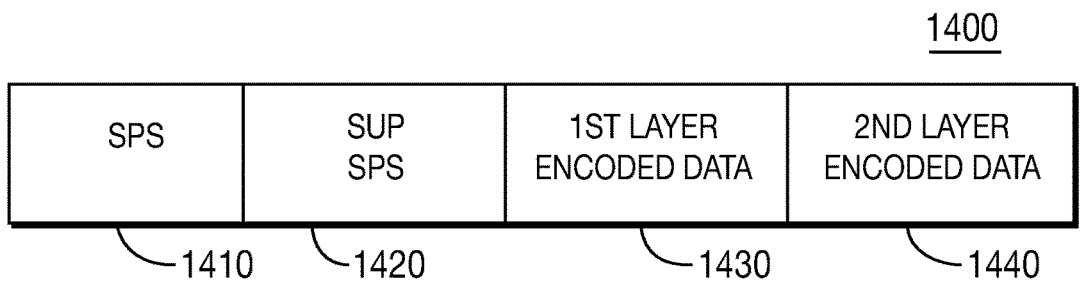
FIG. 14
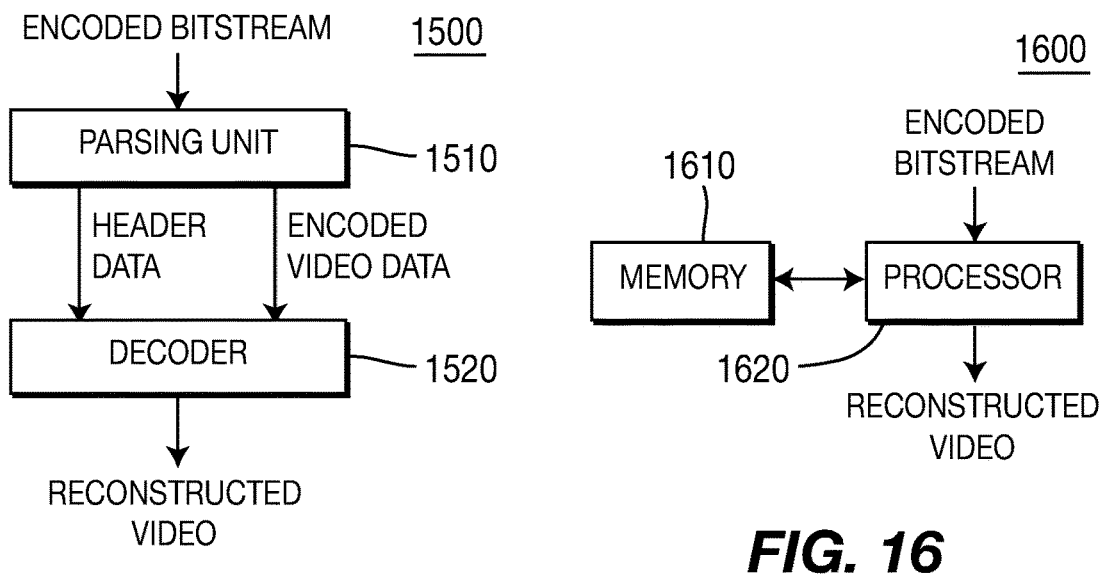
FIG. 15
FIG. 16
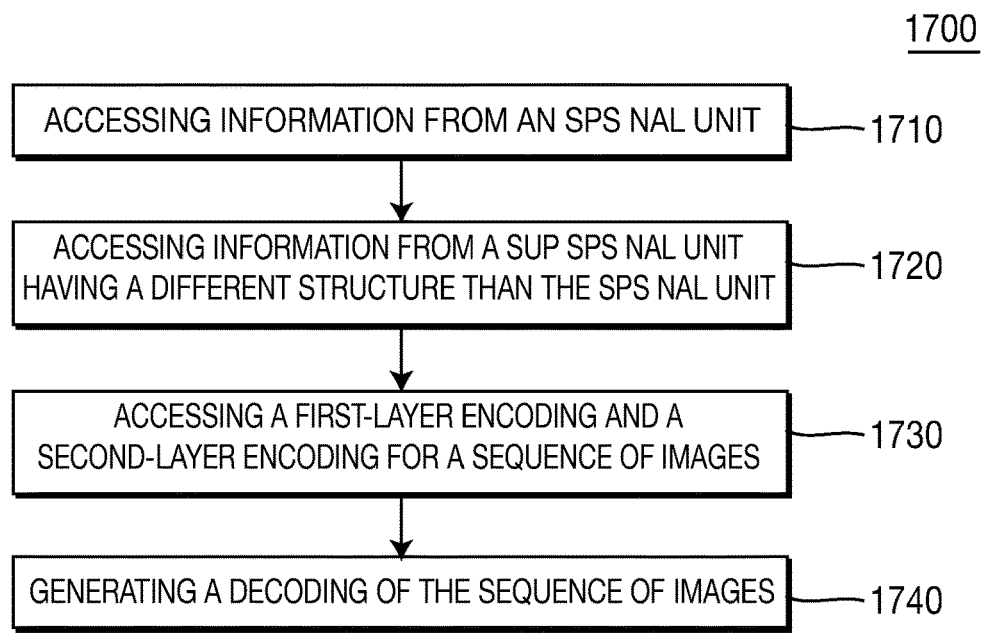
FIG. 17

DECODING MULTI-LAYER IMAGES

CROSS-REFERENCE TO RELATED APPLICATIONS

This application is a continuation of co-pending U.S. application Ser. No. 16/394,987 filed Apr. 25, 2019, which is a continuation of U.S. application Ser. No. 14/602,631, filed Jan. 22, 2015, which is a continuation of U.S. application Ser. No. 14/075,528 filed Nov. 8, 2013, which is a continuation of U.S. application Ser. No. 12/450,868 filed Mar. 5, 2010, and granted as U.S. Pat. No. 8,619,871 on Dec. 31, 2013, both of which are herein incorporated in their entirety by reference. This application claims the benefit, under 35 U.S.C. § 365 of International Application PCT/US2008/004530 filed Apr. 7, 2008, which was published in accordance with PCT Article 21(2) on Oct. 30, 2008 in English and which claims the benefit of U.S. provisional patent application No. 60/923,993 filed Apr. 18, 2007, and U.S. patent application Ser. No. 11/824,006 filed Jun. 28, 2007, each of which is herein incorporated in its entirety by reference.

TECHNICAL FIELD

At least one implementation relates to encoding and decoding video data in a scalable manner.

BACKGROUND

Coding video data according to several layers can be useful when terminals for which data are intended have different capacities and therefore do not decode a full data stream but only part of a full data stream. When the video data are coded according to several layers in a scalable manner, the receiving terminal can extract from the received bit-stream a portion of the data according to the terminal's profile. A full data stream may also transmit overhead information for each supported layer, to facilitate decoding of each of the layers at a terminal.

SUMMARY

According to a general aspect, information is accessed from a sequence parameter set ("SPS") network abstraction layer ("NAL") unit. The information describes a parameter for use in decoding a first-layer encoding of a sequence of images. Information is also accessed from a supplemental SPS NAL unit having a different structure than the SPS NAL unit. The information from the supplemental SPS NAL unit describes a parameter for use in decoding a second-layer encoding of the sequence of images. A decoding of the sequence of images is generated based on the first-layer encoding, the second-layer encoding, the accessed information from the SPS NAL unit, and the accessed information from the supplemental SPS NAL unit.

According to another general aspect, a syntax structure is used that provides for decoding a sequence of images in multiple layers. The syntax structure includes syntax for an SPS NAL unit including information describing a parameter for use in decoding a first-layer encoding of a sequence of images. The syntax structure also includes syntax for a supplemental SPS NAL unit having a different structure than the SPS NAL unit. The supplemental SPS NAL unit includes information describing a parameter for use in decoding a second-layer encoding of the sequence of images. A decoding of the sequence of images may be generated based on the first-layer encoding, the second-layer encoding, the information from the SPS NAL unit, and the information from the supplemental SPS NAL unit.

According to another general aspect, a signal is formatted to include information from an SPS NAL unit. The information describes a parameter for use in decoding a first-layer encoding of a sequence of images. The signal is further formatted to include information from a supplemental SPS NAL unit having a different structure than the SPS NAL unit. The information from the supplemental SPS NAL unit describes a parameter for use in decoding a second-layer encoding of the sequence of images.

According to another general aspect, a SPS NAL unit is generated that includes information describing a parameter for use in decoding a first-layer encoding of a sequence of images. A supplemental SPS NAL unit is generated that has a different structure than the SPS NAL unit. The supplemental SPS NAL unit includes information that describes a parameter for use in decoding a second-layer encoding of the sequence of images. A set of data is provided that includes the first-layer encoding of the sequence of images, the second-layer encoding of the sequence of images, the SPS NAL unit, and the supplemental SPS NAL unit.

According to another general aspect, a syntax structure is used that provides for encoding a sequence of images in multiple layers. The syntax structure includes syntax for an SPS NAL unit. The SPS NAL unit includes information that describes a parameter for use in decoding a first-layer encoding of a sequence of images. The syntax structure includes syntax for a supplemental SPS NAL unit. The supplemental SPS NAL unit has a different structure than the SPS NAL unit. The supplemental SPS NAL unit includes information that describes a parameter for use in decoding a second-layer encoding of the sequence of images. A set of data may be provided that includes the first-layer encoding of the sequence of images, the second-layer encoding of the sequence of images, the SPS NAL unit, and the supplemental SPS NAL unit.

According to another general aspect, first layer-dependent information is accessed in a first normative parameter set. The accessed first layer-dependent information is for use in decoding a first-layer encoding of a sequence of images. Second layer-dependent information is accessed in a second normative parameter set. The second normative parameter set has a different structure than the first normative parameter set. The accessed second layer-dependent information is for use in decoding a second-layer encoding of the sequence of images. The sequence of images is decoded based on one or more of the accessed first layer-dependent information or the accessed second layer-dependent information.

According to another general aspect, a first normative parameter set is generated that includes first layer-dependent information. The first layer-dependent information is for use in decoding a first-layer encoding of a sequence of images. A second normative parameter set is generated having a different structure than the first normative parameter set. The second normative parameter set includes second layer-dependent information for use in decoding a second-layer encoding of the sequence of images. A set of data is provided that includes the first normative parameter set and the second normative parameter set.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 14 is a block view of an example of a data stream generated by the process of FIG. 13.

FIG. 15 is a block diagram of an implementation of a decoder.

FIG. 16 is a block diagram of another implementation of a decoder.

FIG. 17 is a flow chart of an implementation of a decoding process used by the decoders of FIG. 15 or 16.

DETAILED DESCRIPTION

Figure 1:
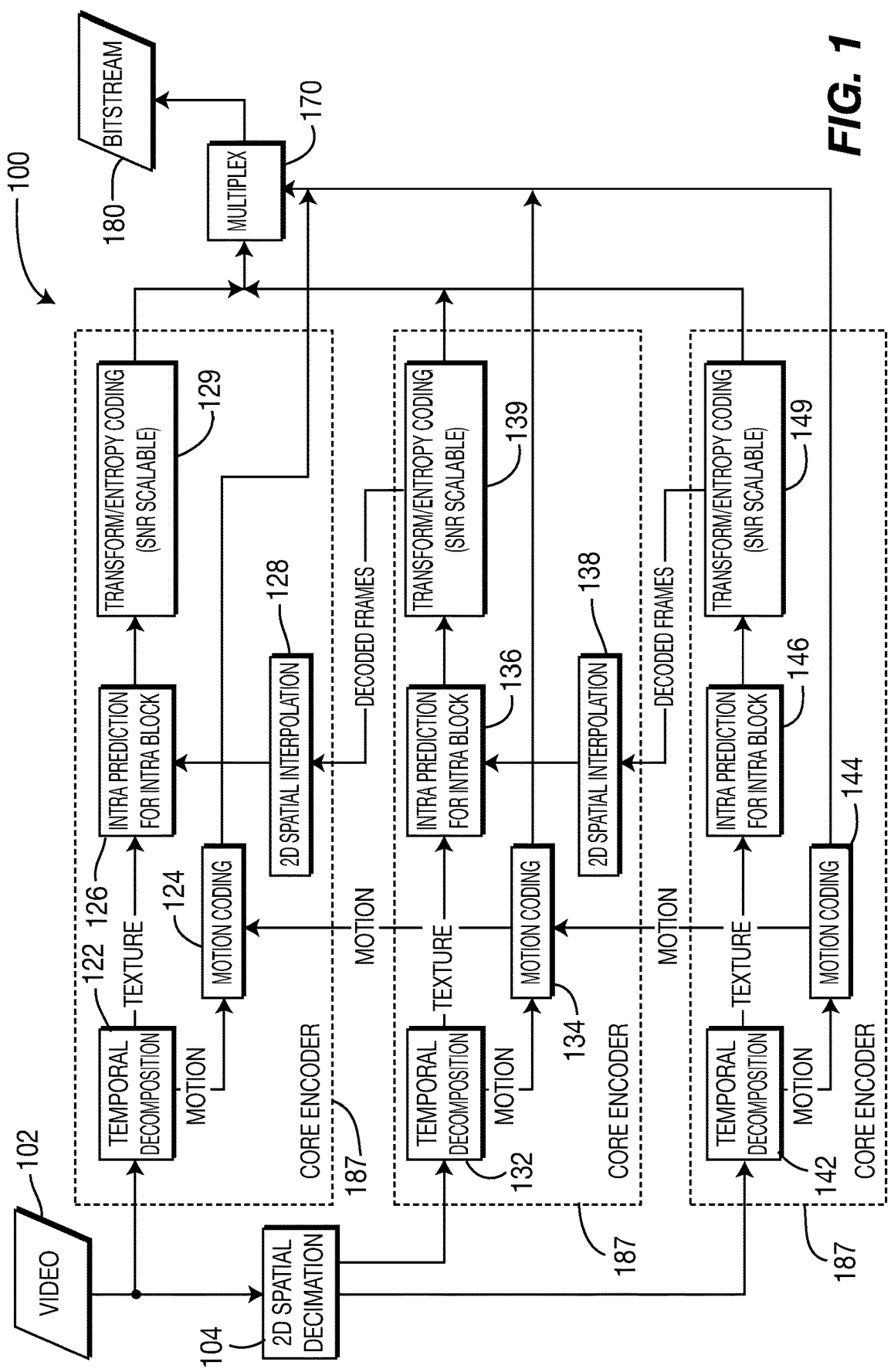
FIG. 1 is a block diagram for an implementation of an encoder.

Several video coding standards exist today that can code video data according to different layers and/or profiles. Among them, one can cite H.264/MPEG-4 AVC (the "AVC standard"), also referenced as the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation. Additionally, extensions to the AVC standard exist. A first such extension is a scalable video coding ("SVC") extension (Annex G) referred to as H.264/MPEG-4 AVC, scalable video coding extension (the "SVC extension"). A second such extension is a multi-view video coding ("MVC") extension (Annex H) referred to as H.264/MPEG-4 AVC, MVC extension (the "MVC extension").

At least one implementation described in this disclosure may be used with the AVC standard as well as the SVC and MVC extensions. The implementation provides a supplemental ("SUP") sequence parameter set ("SPS") network abstraction layer ("NAL") unit having a different NAL unit type than SPS NAL units. An SPS unit typically includes, but need not, information for at least a single layer. Further, the SUP SPS NAL unit includes layer-dependent information for at least one additional layer. Thus, by accessing SPS and SUP SPS units, a decoder has available certain (and typically all) layer-dependent information needed to decode a bit stream.

Using this implementation in an AVC system, the SUP SPS NAL units need not be transmitted, and a single-layer SPS NAL unit (as described below) may be transmitted. Using this implementation in an SVC (or MVC) system, the SUP SPS NAL unit(s) may be transmitted for the desired additional layers (or views), in addition to an SPS NAL unit. Using this implementation in a system including both AVC-compatible decoders and SVC-compatible (or MVC-compatible) decoders, the AVC-compatible decoders may ignore the SUP SPS NAL units by detecting the NAL unit type. In each case, efficiency and compatibility are achieved.

The above implementation also provides benefits for systems (standards or otherwise) that impose a requirement that certain layers share header information, such as, for example, an SPS or particular information typically carried in an SPS. For example, if a base layer and its composite temporal layers need to share an SPS, then the layer-dependent information cannot be transmitted with the shared SPS. However, the SUP SPS provides a mechanism for transmitting the layer-dependent information.

The SUP SPS of various implementations also provides an efficiency advantage in that the SUP SPS need not include, and therefore repeat, all of the parameters in the SPS. The SUP SPS will typically be focused on the layer-dependent parameters. However, various implementations include a SUP SPS structure that includes non-layer-dependent parameters, or even repeats all of an SPS structure.

Various implementations relate to the SVC extension. The SVC extension proposes the transmission of video data according to several spatial levels, temporal levels, and quality levels. For one spatial level, one can code according to several temporal levels, and for each temporal level according to several quality levels. Therefore, when there are defined m spatial levels, n temporal levels, and O quality levels, the video data can be coded according to m*n*O different combinations. These combinations are referred to as layers, or as interoperability points ("IOPs"). According to the decoder (also referred to as the receiver or the client) capabilities, different layers may be transmitted up to a certain layer corresponding to the maximum of the client capabilities.

As used herein, "layer-dependent" information refers to information that relates specifically to a single layer. That is, as the name suggests, the information is dependent upon the specific layer. Such information need not necessarily vary from layer to layer, but would typically be provided separately for each layer.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level, and Network Abstraction Layer (NAL) unit header level.

Referring to FIG. 1, an exemplary SVC encoder is indicated generally by the reference numeral 100. The SVC encoder 100 may also be used for AVC encoding, that is, for a single layer (for example, base layer). Further, the SVC encoder 100 may be used for MVC encoding as one of ordinary skill in the art will appreciate. For example, various components of the SVC encoder 100, or variations of these components, may be used in encoding multiple views.

A first output of a temporal decomposition module 142 is connected in signal communication with a first input of an intra prediction for intra block module 146. A second output of the temporal decomposition module 142 is connected in signal communication with a first input of a motion coding module 144. An output of the intra prediction for intra block module 146 is connected in signal communication with an input of a transform/entropy coder (signal to noise ratio (SNR) scalable) 149. A first output of the transform/entropy coder 149 is connected in signal communication with a first input of a multiplexer 170.

A first output of a temporal decomposition module 132 is connected in signal communication with a first input of an intra prediction for intra block module 136. A second output of the temporal decomposition module 132 is connected in signal communication with a first input of a motion coding module 134. An output of the intra prediction for intra block module 136 is connected in signal communication with an input of a transform/entropy coder (signal to noise ratio (SNR) scalable) 139. A first output of the transform/entropy coder 139 is connected in signal communication with a first input of a multiplexer 170.

A second output of the transform/entropy coder 149 is connected in signal communication with an input of a 2D spatial interpolation module 138. An output of 2D spatial interpolation module 138 is connected in signal communication with a second input of the intra prediction for intra block module 136. A second output of the motion coding module 144 is connected in signal communication with an input of the motion coding module 134.

A first output of a temporal decomposition module 122 is connected in signal communication with a first input of an intra predictor 126. A second output of the temporal decomposition module 122 is connected in signal communication with a first input of a motion coding module 124. An output of the intra predictor 126 is connected in signal communication with an input of a transform/entropy coder (signal to noise ratio (SNR) scalable) 129. An output of the transform/entropy coder 129 is connected in signal communication with a first input of a multiplexer 170.

A second output of the transform/entropy coder 139 is connected in signal communication with an input of a 2D spatial interpolation module 128. An output of 2D spatial interpolation module 128 is connected in signal communication with a second input of the intra predictor module 126. A second output of the motion coding module 134 is connected in signal communication with an input of the motion coding module 124.

A first output of the motion coding module 124, a first output of the motion coding module 134, and a first output of the motion coding module 144 are each connected in signal communication with a second input of the multiplexer 170.

A first output of a 2D spatial decimation module 104 is connected in signal communication with an input of the temporal decomposition module 132. A second output of the 2D spatial decimation module 104 is connected in signal communication with an input of the temporal decomposition module 142.

An input of the temporal decomposition module 122 and an input of the 2D spatial decimation module 104 are available as inputs of the encoder 100, for receiving input video 102.

An output of the multiplexer 170 is available as an output of the encoder 100, for providing a bitstream 180.

The temporal decomposition module 122, the temporal decomposition module 132, the temporal decomposition module 142, the motion coding module 124, the motion coding module 134, the motion coding module 144, the intra predictor 126, the intra predictor 136, the intra predictor 146, the transform/entropy coder 129, the transform/entropy coder 139, the transform/entropy coder 149, the 2D spatial interpolation module 128, and the 2D spatial interpolation module 138 are included in a core encoder portion 187 of the encoder 100.

FIG. 1 includes three core encoders 187. In the implementation shown, the bottom-most core encoder 187 may encode a base layer, with the middle and upper core encoders 187 encoding higher layers.

Figure 2:
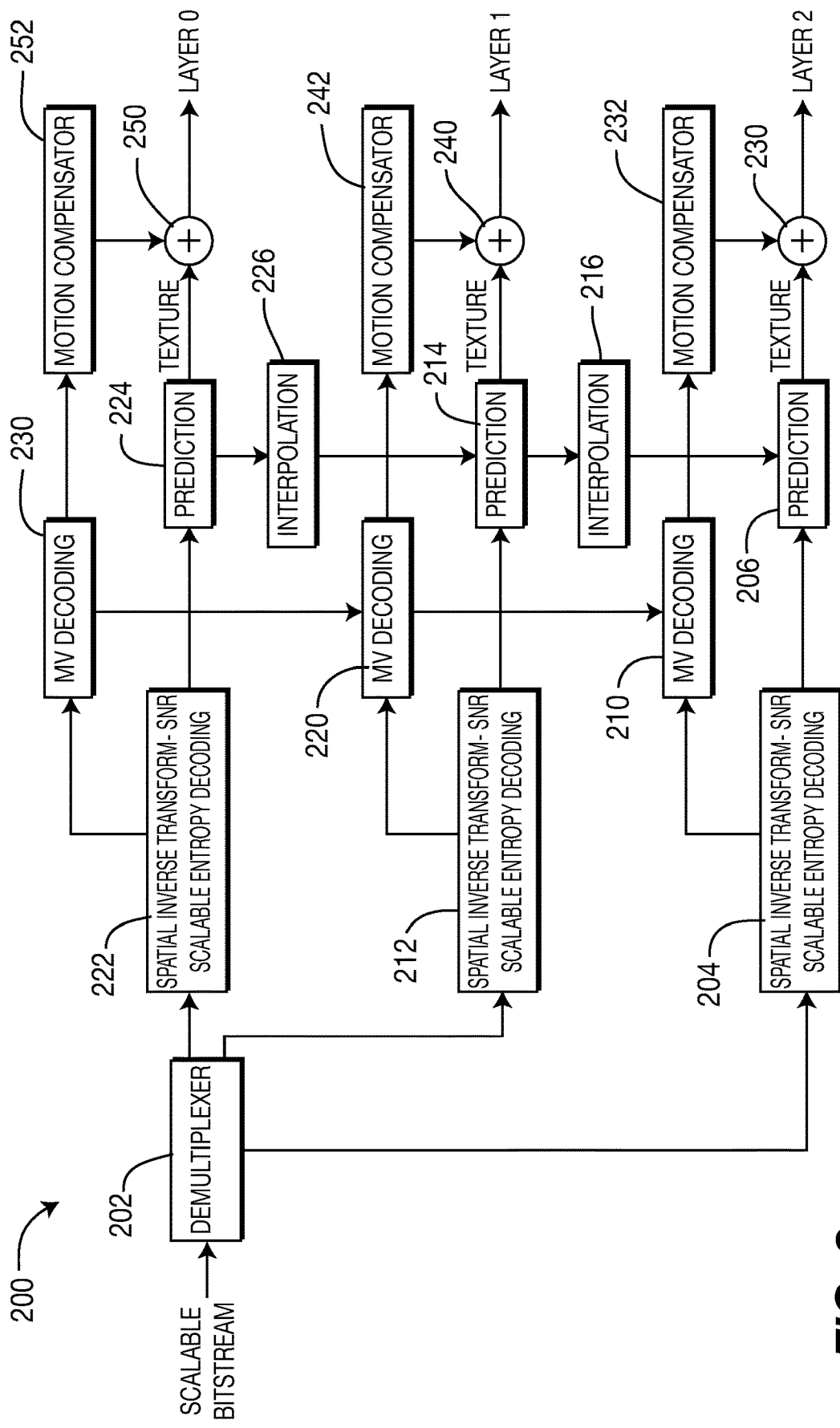
FIG. 2 is a block diagram for an implementation of a decoder.

Turning to FIG. 2, an exemplary SVC decoder is indicated generally by the reference numeral 200. The SVC decoder 200 may also be used for AVC decoding, that is, for a single view. Further, the SVC decoder 200 may be used for MVC decoding as one of ordinary skill in the art will appreciate. For example, various components of the SVC decoder 200, or variations of these components, may be used in decoding multiple views.

Note that encoder 100 and decoder 200, as well as other encoders and decoders discussed in this disclosure, can be configured to perform various methods shown throughout this disclosure. In addition to performing encoding operations, the encoders described in this disclosure may perform various decoding operations during a reconstruction process in order to mirror the expected actions of a decoder. For example, an encoder may decode SUP SPS units to decode encoded video data in order to produce a reconstruction of the encoded video data for use in predicting additional video data. Consequently, an encoder may perform substantially all of the operations that are performed by a decoder.

An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of a combiner 230.

A second output of the spatial inverse transform SNR scalable entropy decoder 204 is connected in signal communication with a first input of a motion vector (MV) decoder 210. An output of the MV decoder 210 is connected in signal communication with an input of a motion compensator 232. An output of the motion compensator 232 is connected in signal communication with a second input of the combiner 230.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of a combiner 240.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with an input of a motion compensator 242. An output of the motion compensator 242 is connected in signal communication with a second input of the combiner 240.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of a combiner 250. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with an input of a motion compensator 252. An output of the motion compensator 252 is connected in signal communication with a second input of the combiner 250.

An output of the combiner 250 is available as an output of the decoder 200, for outputting a layer 0 signal. An output of the combiner 240 is available as an output of the decoder 200, for outputting a layer 1 signal. An output of the combiner 230 is available as an output of the decoder 200, for outputting a layer 2 signal.

Figure 1A:
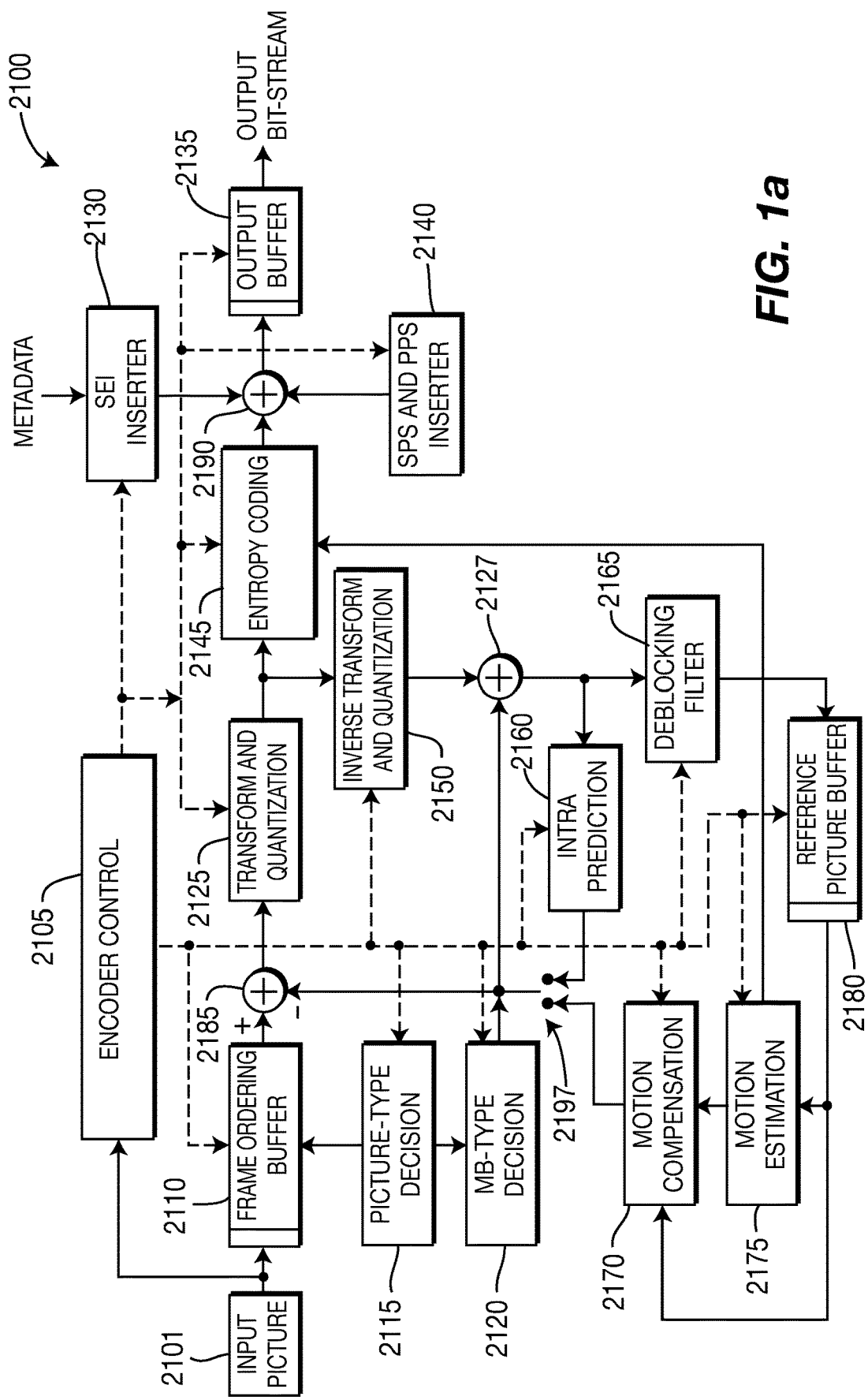
FIG. 1a is a block diagram for another implementation of an encoder.

Referring to FIG. 1a, an exemplary AVC encoder is indicated generally by the reference numeral 2100. The AVC encoder 2100 may be used, for example, for encoding a single layer (for example, base layer).

The video encoder 2100 includes a frame ordering buffer 2110 having an output in signal communication with a non-inverting input of a combiner 2185. An output of the combiner 2185 is connected in signal communication with a first input of a transformer and quantizer 2125. An output of the transformer and quantizer 2125 is connected in signal communication with a first input of an entropy coder 2145 and a first input of an inverse transformer and inverse quantizer 2150. An output of the entropy coder 2145 is connected in signal communication with a first non-inverting input of a combiner 2190. An output of the combiner 2190 is connected in signal communication with a first input of an output buffer 2135.

A first output of an encoder controller 2105 is connected in signal communication with a second input of the frame ordering buffer 2110, a second input of the inverse transformer and inverse quantizer 2150, an input of a picture-type decision module 2115, an input of a macroblock-type (MB-type) decision module 2120, a second input of an intra prediction module 2160, a second input of a deblocking filter 2165, a first input of a motion compensator 2170, a first input of a motion estimator 2175, and a second input of a reference picture buffer 2180.

A second output of the encoder controller 2105 is connected in signal communication with a first input of a Supplemental Enhancement Information ("SEI") inserter 2130, a second input of the transformer and quantizer 2125, a second input of the entropy coder 2145, a second input of the output buffer 2135, and an input of the Sequence Parameter Set (SPS) and Picture Parameter Set (PPS) inserter 2140.

A first output of the picture-type decision module 2115 is connected in signal communication with a third input of a frame ordering buffer 2110. A second output of the picture-type decision module 2115 is connected in signal communication with a second input of a macroblock-type decision module 2120.

An output of the Sequence Parameter Set ("SPS") and Picture Parameter Set ("PPS") inserter 2140 is connected in signal communication with a third non-inverting input of the combiner 2190. An output of the SEI Inserter 2130 is connected in signal communication with a second non-inverting input of the combiner 2190.

An output of the inverse quantizer and inverse transformer 2150 is connected in signal communication with a first non-inverting input of a combiner 2127. An output of the combiner 2127 is connected in signal communication with a first input of the intra prediction module 2160 and a first input of the deblocking filter 2165. An output of the deblocking filter 2165 is connected in signal communication with a first input of a reference picture buffer 2180. An output of the reference picture buffer 2180 is connected in signal communication with a second input of the motion estimator 2175 and with a first input of a motion compensator 2170. A first output of the motion estimator 2175 is connected in signal communication with a second input of the motion compensator 2170. A second output of the motion estimator 2175 is connected in signal communication with a third input of the entropy coder 2145.

An output of the motion compensator 2170 is connected in signal communication with a first input of a switch 2197. An output of the intra prediction module 2160 is connected in signal communication with a second input of the switch 2197. An output of the macroblock-type decision module 2120 is connected in signal communication with a third input of the switch 2197 in order to provide a control input to the switch 2197. An output of the switch 2197 is connected in signal communication with a second non-inverting input of the combiner 2127 and with an inverting input of the combiner 2185.

Inputs of the frame ordering buffer 2110 and the encoder controller 2105 are available as input of the encoder 2100, for receiving an input picture 2101. Moreover, an input of the SEI inserter 2130 is available as an input of the encoder 2100, for receiving metadata. An output of the output buffer 2135 is available as an output of the encoder 2100, for outputting a bitstream.

Figure 2A:
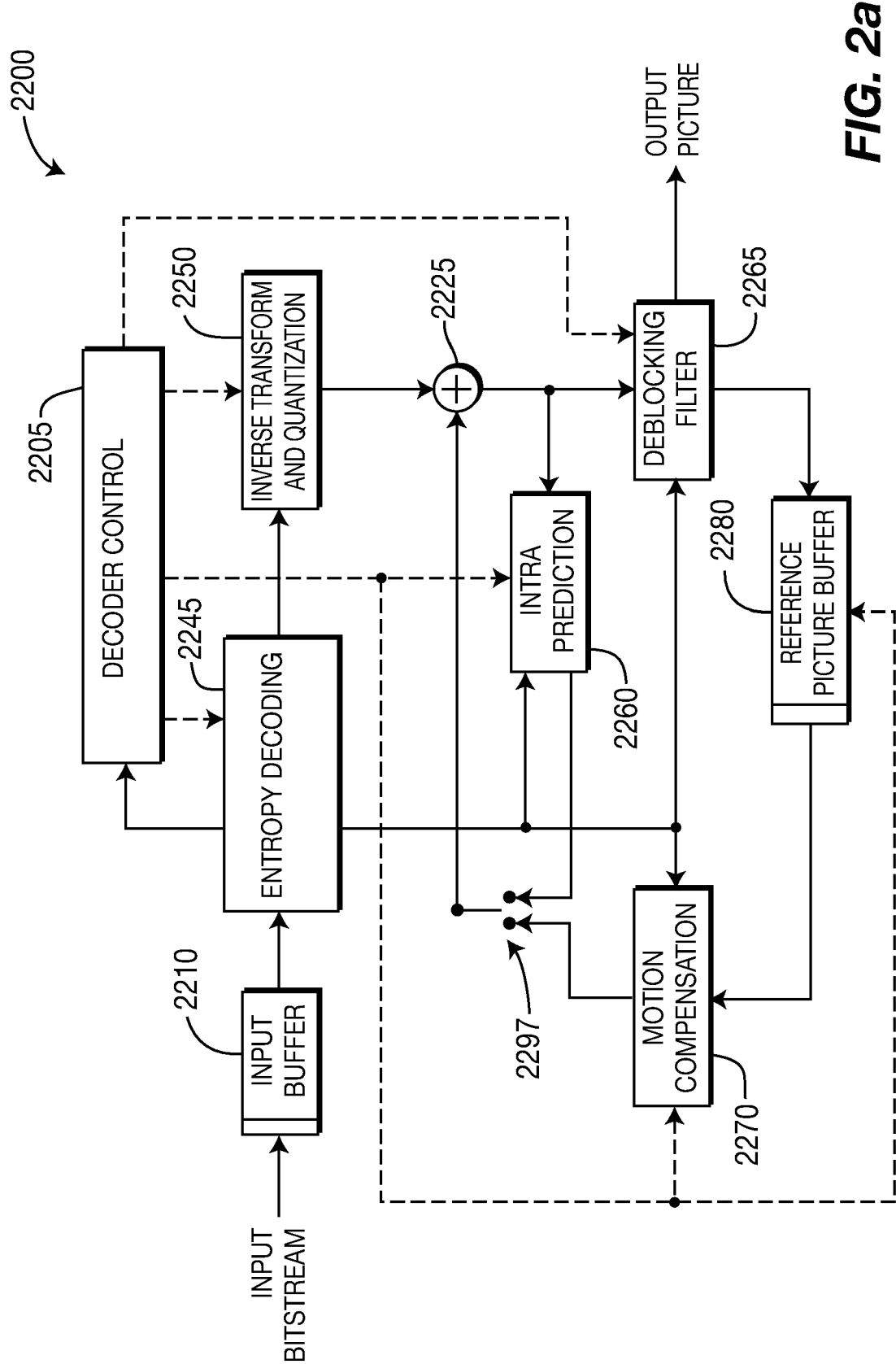
FIG. 2a is a block diagram for another implementation of a decoder.

Referring to FIG. 2a, a video decoder capable of performing video decoding in accordance with the MPEG-4 AVC standard is indicated generally by the reference numeral 2200.

The video decoder 2200 includes an input buffer 2210 having an output connected in signal communication with a first input of an entropy decoder 2245. A first output of the entropy decoder 2245 is connected in signal communication with a first input of an inverse transformer and inverse quantizer 2250. An output of the inverse transformer and inverse quantizer 2250 is connected in signal communication with a second non-inverting input of a combiner 2225. An output of the combiner 2225 is connected in signal communication with a second input of a deblocking filter 2265 and a first input of an intra prediction module 2260. A second output of the deblocking filter 2265 is connected in signal communication with a first input of a reference picture buffer 2280. An output of the reference picture buffer 2280 is connected in signal communication with a second input of a motion compensator 2270.

A second output of the entropy decoder 2245 is connected in signal communication with a third input of the motion compensator 2270 and a first input of the deblocking filter 2265. A third output of the entropy decoder 2245 is connected in signal communication with an input of a decoder controller 2205. A first output of the decoder controller 2205 is connected in signal communication with a second input of the entropy decoder 2245. A second output of the decoder controller 2205 is connected in signal communication with a second input of the inverse transformer and inverse quantizer 2250. A third output of the decoder controller 2205 is connected in signal communication with a third input of the deblocking filter 2265. A fourth output of the decoder controller 2205 is connected in signal communication with a second input of the intra prediction module 2260, with a first input of the motion compensator 2270, and with a second input of the reference picture buffer 2280.

An output of the motion compensator 2270 is connected in signal communication with a first input of a switch 2297. An output of the intra prediction module 2260 is connected in signal communication with a second input of the switch 2297. An output of the switch 2297 is connected in signal communication with a first non-inverting input of the combiner 2225.

An input of the input buffer 2210 is available as an input of the decoder 2200, for receiving an input bitstream. A first output of the deblocking filter 2265 is available as an output of the decoder 2200, for outputting an output picture.

Figure 3:
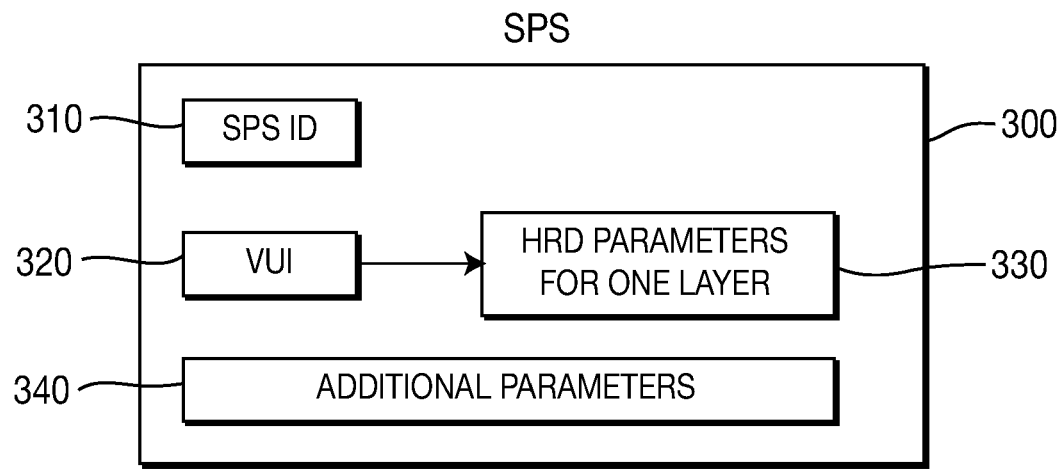
FIG. 3 is a structure of an implementation of a Single-Layer Sequence Parameter Set ("SPS") Network Abstraction Layer ("NAL") unit.

Referring to FIG. 3, a structure for a single-layer SPS 300 is shown. SPS is a syntax structure that generally contains syntax elements that apply to zero or more entire coded video sequences. In the SVC extension, the values of some syntax elements conveyed in the SPS are layer dependent. These layer-dependent syntax elements include but are not limited to, the timing information, HRD (standing for "Hypothetical Reference Decoder") parameters, and bitstream restriction information. HRD parameters may include, for example, indicators of buffer size, maximum bit rate, and initial delay. HRD parameters may allow a receiving system, for example, to verify the integrity of a received bit stream and/or to determine if the receiving system (for example, a decoder) can decode the bit stream. Therefore, a system may provide for the transmission of the aforementioned syntax elements for each layer.

The single-layer SPS 300 includes an SPS-ID 310 that provides an identifier for the SPS. The single-layer SPS 300 also includes the VUI (standing for Video Usability Information) parameters 320 for a single layer. The VUI parameters include the HRD parameters 330 for a single layer, such as, for example, the base layer. The single-layer SPS 300 also may include additional parameters 340, although implementations need not include any additional parameters 340.

Figure 4:
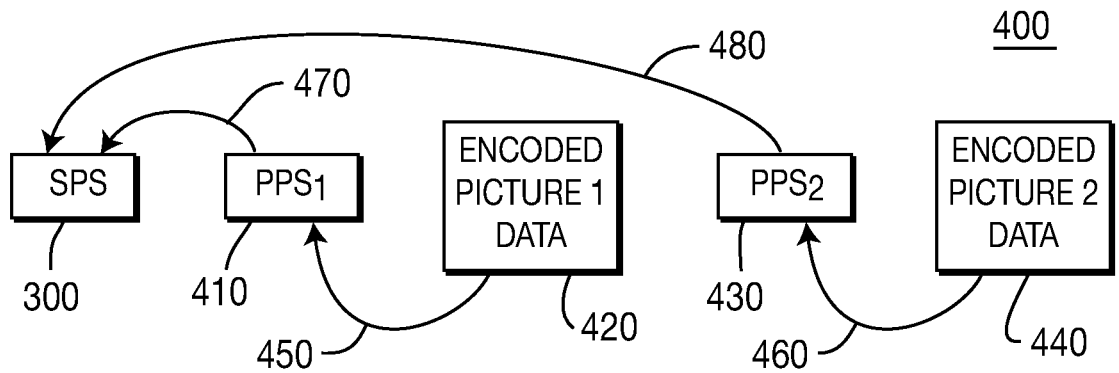
FIG. 4 is a block view of an example of portions of a data stream illustrating use of an SPS NAL unit.

Referring to FIG. 4, a block view of a data stream 400 shows a typical use of the single-layer SPS 300. In the AVC standard, for example, a typical data stream may include, among other components, an SPS unit, multiple PPS (picture parameter sequence) units providing parameters for a particular picture, and multiple units for encoded picture data. Such a general framework is followed in FIG. 4, which includes the SPS 300, a PPS-1 410, one or more units 420 including encoded picture-1 data, a PPS-2 430, and one or more units 440 including encoded picture-2 data. The PPS-1 410 includes parameters for the encoded picture-1 data 420, and the PPS-2 430 includes parameters for the encoded picture-2 data 440.

The encoded picture-1 data 420, and the encoded picture-2 data 440, are each associated with a particular SPS (the SPS 300 in the implementation of FIG. 4). This is achieved through the use of pointers, as now explained. The encoded picture-1 data 420 includes a PPS-ID (not shown) identifying the PPS-1 410, as shown by an arrow 450. The PPS-ID may be stored in, for example, a slice header. The encoded picture-2 data 440 includes a PPS-ID (not shown) identifying the PPS-2 430, as shown by an arrow 460. The PPS-1 410 and the PPS-2 430 each include an SPS-ID (not shown) identifying the SPS 300, as shown by arrows 470 and 480 respectively.

Figure 5:
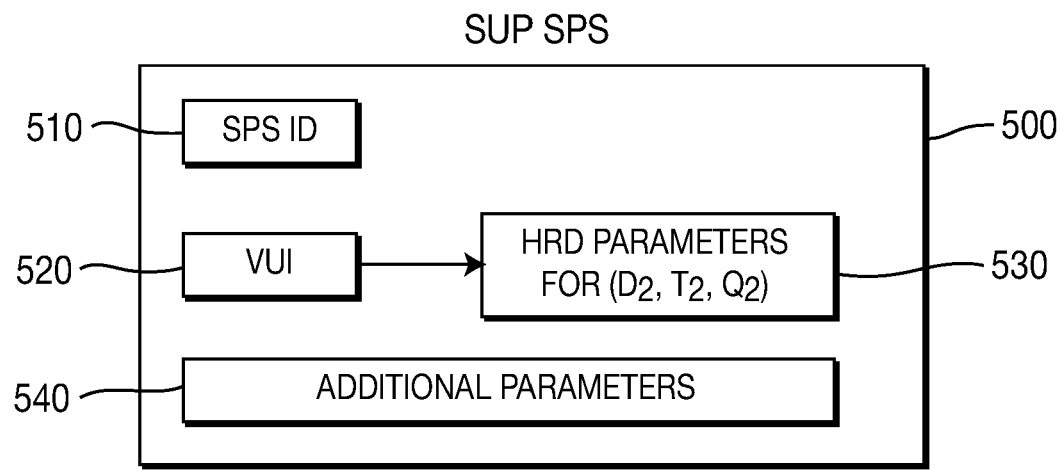
FIG. 5 is a structure of an implementation of a supplemental SPS ("SUP SPS") NAL unit.

Referring to FIG. 5, a structure for a SUP SPS 500 is shown. SUP SPS 500 includes an SPS ID 510, a VUI 520 that includes HRD parameters 530 for a single additional layer referred to by "(D2, T2, Q2)", and optional additional parameters 540. "D2, T2, Q2" refers to a second layer having spatial (D) level 2, temporal (T) level 2, and quality (Q) level 2.

Note that various numbering schemes may be used to refer to layers. In one numbering scheme, base layers have a D, T, Q of 0, x, 0, meaning a spatial level of zero, any temporal level, and a quality level of zero. In that numbering scheme, enhancement layers have a D, T, Q in which D or Q are greater than zero.

The use of SUP SPS 500 allows, for example, a system to use an SPS structure that only includes parameters for a single layer, or that does not include any layer-dependent information. Such a system may create a separate SUP SPS for each additional layer beyond the base layer. The additional layers can identify the SPS with which they are associated through the use of the SPS ID 510. Clearly several layers can share a single SPS by using a common SPS ID in their respective SUP SPS units.

Figure 6:
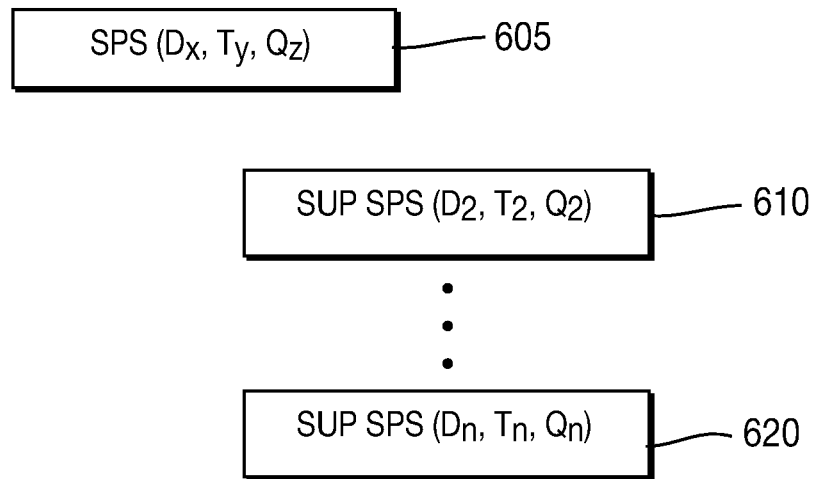
FIG. 6 is an implementation of an organizational hierarchy among an SPS unit and multiple SUP SPS units.

Referring to FIG. 6, an organizational hierarchy 600 is shown among an SPS unit 605 and multiple SUP SPS units 610 and 620. The SUP SPS units 610 and 620 are shown as being single-layer SUP SPS units, but other implementations may use one or more multiple-layer SUP SPS units in addition to, or in lieu of, single-layer SUP SPS units. The hierarchy 600 illustrates that, in a typical scenario, multiple SUP SPS units may be associated with a single SPS unit. Implementations may, of course, include multiple SPS units, and each of the SPS units may have associated SUP SPS units.

Figure 7:
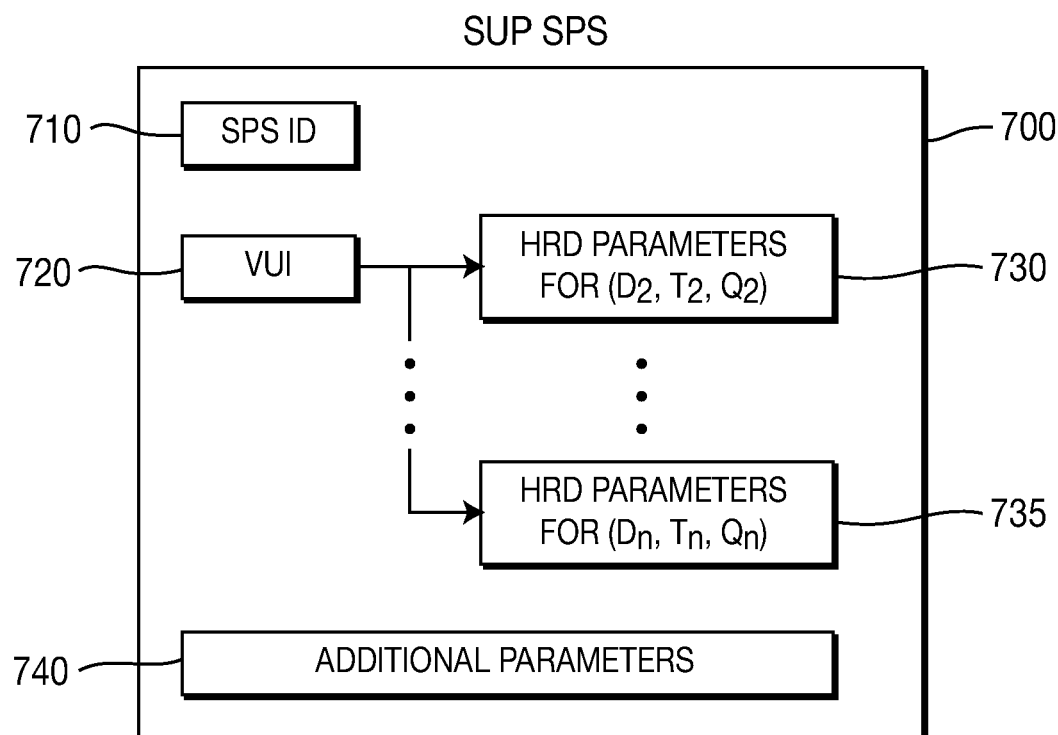
FIG. 7 is a structure of another implementation of a SUP SPS NAL unit.

Referring to FIG. 7, a structure for another SUP SPS 700 is shown. SUP SPS 700 includes parameters for multiple layers, whereas SUP SPS 500 includes parameters for a single layer. SUP SPS 700 includes an SPS ID 710, a VUI 720, and optional additional parameters 740. The VUI 720 includes HRD parameters 730 for a first additional layer (D2, T2, Q2), and for other additional layers up to layer (Dn, Tn, Qn).

Referring again to FIG. 6, the hierarchy 600 may be modified to use a multiple layer SUP SPS. For example, the combination of the SUP SPS 610 and 620 may be replaced with the SUP SPS 700 if both the SUP SPS 610 and 620 include the same SPS ID.

Additionally, the SUP SPS 700 may be used, for example, with an SPS that includes parameters for a single layer, or that includes parameters for multiple layers, or that does not include layer-dependent parameters for any layers. The SUP SPS 700 allows a system to provide parameters for multiple layers with little overhead.

Other implementations may be based, for example, on an SPS that includes all the needed parameters for all possible layers. That is, the SPS of such an implementation includes all the corresponding spatial ($D_i$), temporal ($T_i$), and quality ($Q_i$) levels that are available to be transmitted, whether all the layers are transmitted or not. Even with such a system, however, a SUP SPS may be used to provide an ability to change the parameters for one or more layers without transmitting the entire SPS again.

Referring to Table 1, syntax is provided for a specific implementation of a single-layer SUP SPS. The syntax includes sequence_parameter_set_id to identify the associated SPS, and the identifiers of temporal_level, dependency_id, and quality_level to identify a scalable layer. The VUI parameters are included through the use of svc_vui_parameters( ) (see Table 2), which includes HRD parameters through the use of hrd_parameters( ). The syntax below allows each layer to specify its own layer-dependent parameters, such as, for example, HRD parameters.

TABLE 1

| | C | Descriptor |
|---|---|---|
| sup_seq_parameter_set_svc ( ) { | | |
|     sequence_parameter_set_id | 0 | ue(v) |
|     temporal_level | 0 | u(3) |
|     dependency_id | 0 | u(3) |
|     quality_level | 0 | u(2) |
|     vui_parameters_present_svc_flag | 0 | u(1) |
|     if( vui_parameters_present_svc_flag ) | | |
|         svc vui_parameters( ) | | |
| } | | |

The semantics for the syntax of sup_seq_parameter_set_svc( ) is as follows.

sequence_parameter_set_id identifies the sequence parameter set which the current SUP SPS maps to for the current layer;

temporal_level, dependency_id, and quality_level specify the temporal level, dependency identifier, and quality level for the current layer. Dependency_id generally indicates spatial level. However, dependency_id also is used to indicate the Coarse Grain Scalability ("CGS") hierarchy, which includes both spatial and SNR scalability, with SNR scalability being a traditional quality scalability. Accordingly, quality_level and dependency_id may both be used to distinguish quality levels.

vui_parameters_present_svc_flag equals to 1 specifies that svc_vui_parameters( ) syntax structure as defined below is present. vui_parameters_present_svc_flag equals to 0 specifies that svc_vui_parameters( ) syntax structure is not present.

Table 2 gives the syntax for svc_vui_parameters( ) The VUI parameters are therefore separated for each layer and put into individual SUP SPS units. Other implementations, however, group the VUI parameters for multiple layers into a single SUP SPS.

TABLE 2

| | C | Descriptor |
|---|---|---|
| svc vui_parameters( ) { | | |
|   timing_info_present_flag | 0 | u(1) |
|   If( timing_info_present_flag ) { | | |
|     num_units_in_tick | 0 | u(32) |
|     time_scale | 0 | u(32) |
|     fixed_frame_rate_flag | 0 | u(1) |
|   } | | |
|   nal_hrd_parameters_present_flag | 0 | u(1) |
|   If( nal_hrd_parameters_present_flag ) | | |
|     hrd_parameters( ) | | |
|   vcl_hrd_parameters_present_flag | 0 | u(1) |
|   If( vcl_hrd_parameters_present_flag ) | | |
|     hrd_parameters( ) | | |
|   If( nal_hrd_parameters_present_flag \|\| | | |
|     vcl_hrd_parameters_present_flag ) | | |
|     low_delay_hrd_flag | 0 | u(1) |
|   pic_struct_present_flag | 0 | u(1) |
|   bitstream_restriction_flag | 0 | u(1) |
|   If( bitstream_restriction_flag ) { | | |
|     motion_vectors_over_pic_boundaries_flag | 0 | u(1) |
|     max_bytes_per_pic_denom | 0 | ue(v) |
|     max_bits_per_mb_denom | 0 | ue(v) |
|     log2_max_mv_length_horizontal | 0 | ue(v) |
|     log2_max_mv_length_vertical | 0 | ue(v) |
|     num_reorder_frames | 0 | ue(v) |
|     max_dec_frame_buffering | 0 | ue(v) |
|   } | | |
| } | | |

The fields of the svc_vui_parameters( ) syntax of Table 2 are defined in the version of the SVC extension that existed in April 2007 under JVT-U201 annex E E.1. In particular, hrd_parameters( ) is as defined for the AVC standard. Note also that svc_vui_parameters( ) includes various layer-dependent information, including HRD-related parameters. The HRD-related parameters include num_units_in_tick, time_scale, fixed_frame_rate_flag, nal_hrd_parameters_present_flag, vcl_hrd_parameters_present_flag, hrd_parameters( ), low_delay_hrd_flag, and pic_struct_present_flag. Further, the syntax elements in the bitsream_restriction_flag if-loop are layer-dependent even though not HRD-related.

As mentioned above, the SUP SPS is defined as a new type of NAL unit. Table 3 lists some of the NAL unit codes as defined by the standard JVT-U201, but modified to assign type 24 to the SUP SPS. The ellipsis between NAL unit types 1 and 16, and between 18 and 24, indicate that those types are unchanged. The ellipsis between NAL unit types 25 and 31 means that those types are all unspecified. The implementation of Table 3 below changes type 24 of the standard from "unspecified" to "sup_seq_parameter_set_svc( )". "Unspecified" is generally reserved for user applications. "Reserved", on the other hand, is generally reserved for future standard modifications. Accordingly, another implementation changes one of the "reserved" types (for example, type 16, 17, or 18) to "sup_seq_parameter_set_svc( )". Changing an "unspecified" type results in an implementation for a given user, whereas changing a "reserved" type results in an implementation that changes the standard for all users.

TABLE 3

| nal_unit_type | Content of NAL unit and RBSP syntax structure | C |
|---|---|---|
| 0 | Unspecified | |
| 1 | Coded slice of a non-IDR picture slice_layer_without_partitioning_rbsp( ) | 2, 3, 4 |
| . . . | . . . | . . . |

TABLE 3-continued

| nal_unit_type | Content of NAL unit and RBSP syntax structure | C |
|---|---|---|
| 16-18 | Reserved | |
| ... | ... | |
| 24 | sup_seq_parameter_set_svc( ) | |
| 25 ... 31 | Unspecified | |

Figure 8:
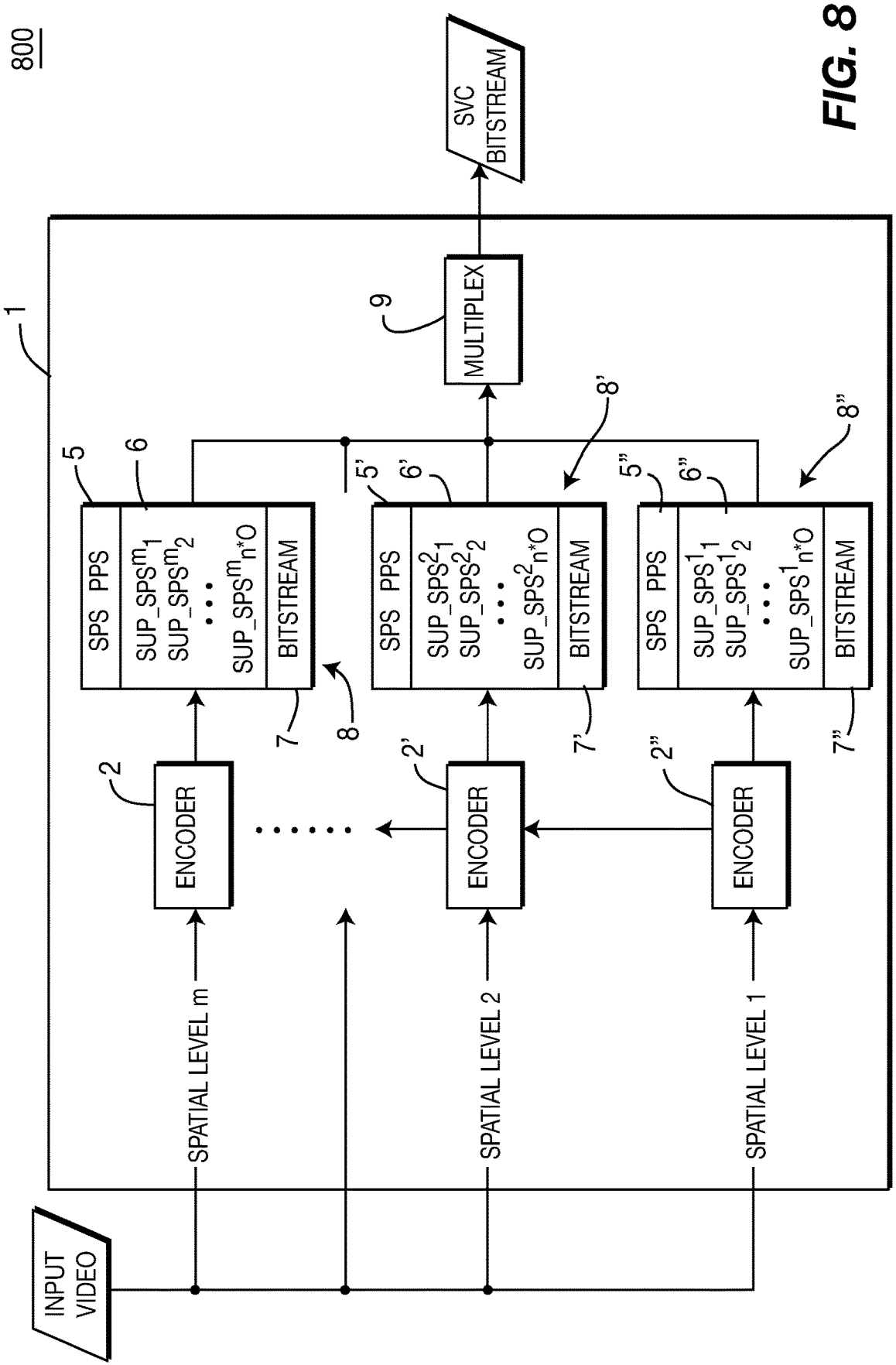
FIG. 8 is a functional view of an implementation of a scalable video coder that generates SUP SPS units.

FIG. 8 shows a functional view of an implementation of a scalable video coder 800 that generates SUP SPS units. A video is received at the input of the scalable video coder 1. The video is coded according to different spatial levels. Spatial levels mainly refer to different levels of resolution of the same video. For example, as the input of a scalable video coder, one can have a CIF sequence (352 per 288) or a QCIF sequence (176 per 144) which represent each one spatial level.

Each of the spatial levels is sent to an encoder. The spatial level 1 is sent to an encoder 2", the spatial level 2 is sent to an encoder 2', and the spatial level m is sent to an encoder 2.

The spatial levels are coded with 3 bits, using the dependency_id. Therefore, the maximum number of spatial levels in this implementation is 8.

The encoders 2, 2', and 2" encode one or more layers having the indicated spatial level. The encoders 2, 2', and 2" may be designed to have particular quality levels and temporal levels, or the quality levels and temporal levels may be configurable. As can be seen from FIG. 8, the encoders 2, 2', and 2" are hierarchically arranged. That is, the encoder 2" feeds the encoder 2', which in turn feeds the encoder 2. The hierarchical arrangement indicates the typical scenario in which higher layers use a lower layer(s) as a reference.

After the coding, the headers are prepared for each of the layers. In the implementation shown, for each spatial level, an SPS message, a PPS message, and multiple SUP_SPS messages are created. SUP SPS messages (or units) may be created, for example, for layers corresponding to the various different quality and temporal levels.

For spatial level 1, SPS and PPS 5" are created and a set of $SUP\_SPS_1^1$, $SUP\_SPS_2^1$, ..., $SUP\_SPS_{n*o}^1$ are also created.

For spatial level 2, SPS and PPS 5' are created and a set of $SUP\_SPS_1^2$, $SUP\_SPS_2^2$, ..., $SUP\_SPS_{n*o}^2$ are also created.

For spatial level m, SPS and PPS 5 are created and a set of $SUP\_SPS_1^m$, $SUP\_SPS_2^m$, ..., $SUP\_SPS_{n*o}^m$ are also created.

The bitstreams 7, 7', and 7" encoded by the encoders 2, 2', and 2", typically follow the plurality of SPS, PPS, and SUP_SPS (also referred to as headers, units, or messages) in the global bitstream.

A bitstream 8" includes SPS and PPS 5", $SUP\_SPS_1^1$, $SUP\_SPS_2^1$, ..., $SUP\_SPS_{n*o}^1$ 6", and encoded video bitstream 7", which constitute all the encoded data associated with spatial level 1.

A bitstream 8' includes SPS and PPS 5', $SUP\_SPS_1^m$, $SUP\_SPS_2^m$, ..., $SUP\_SPS_{n*o}^m$ 6', and encoded video bitstream 7', which constitute all the encoded data associated with spatial level 2.

A bitstream 8 includes SPS and PPS 5, $SUP\_SPS_1^m$, $SUP\_SPS_2^m$, $SUP\_SPS_{n*o}^m$ 6, and encoded video bitstream 7, which constitute all the encoded data associated with spatial level m.

The different SUP_SPS headers are compliant with the headers described in Tables 1-3.

The encoder 800 depicted in FIG. 8 generates one SPS for each spatial level. However, other implementations may generate multiple SPS for each spatial level or may generate an SPS that serves multiple spatial levels.

The bitstreams 8, 8', and 8" are combined in a multiplexer 9 which produces an SVC bitstream, as shown in FIG. 8.

Figure 9:
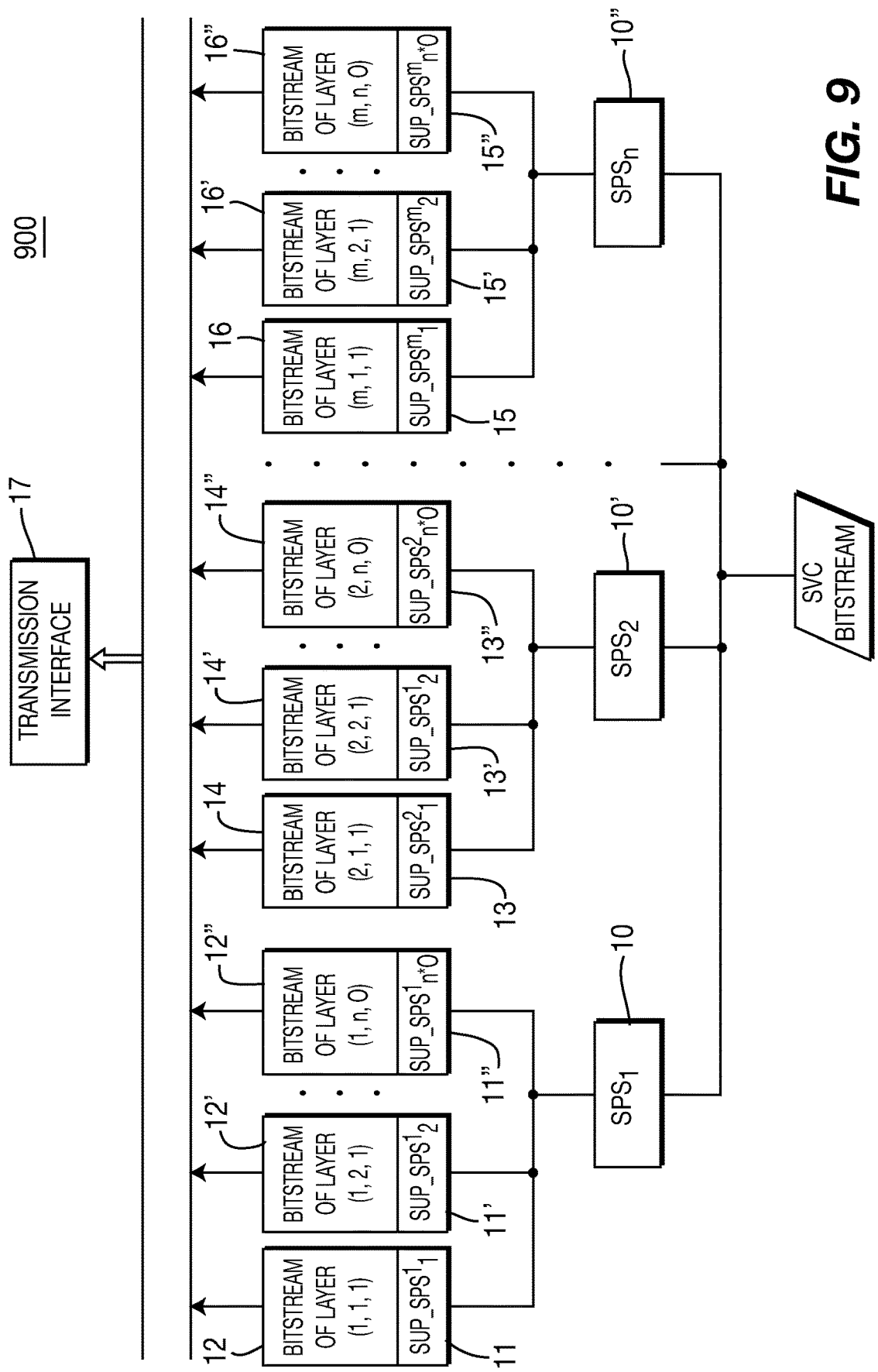
FIG. 9 is a hierarchical view of an implementation of the generation of a data stream that contains SUP SPS units.

Referring to FIG. 9, a hierarchical view 900 illustrates the generation of a data stream that contains SUP SPS units. The view 900 may be used to illustrate the possible bitstreams generated by the scalable video encoder 800 of FIG. 8. The view 900 provides an SVC bitstream to a transmission interface 17.

The SVC bitstream may be generated, for example, according to the implementation of FIG. 8, and comprises one SPS for each of the spatial levels. When m spatial levels are encoded, the SVC bitstream comprises SPS1, SPS2 and SPSm represented by 10, 10' and 10" in FIG. 9.

In the SVC bitstream, each SPS codes the general information relative to the spatial level. The SPS is followed by a header 11, 11', 11", 13, 13', 13", 15, 15', and 15" of SUP_SPS type. The SUP_SPS is followed by the corresponding encoded video data 12, 12', 12", 14, 14', 14", 16, 16', and 16" which each correspond to one temporal level (n) and one quality level (0).

Therefore, when one layer is not transmitted, the corresponding SUP_SPS is also not transmitted. This is because there is typically one SUP_SPS header corresponding to each layer.

Typical implementations use a numbering scheme for layers in which the base layer has a D and Q of zero. If such a numbering scheme is used for the view 900, then the view 900 does not explicitly show a base layer. That does not preclude the use of a base layer. Additionally, however, the view 900 may be augmented to explicitly show a bitstream for a base layer, as well as, for example, a separate SPS for a base layer. Further, the view 900 may use an alternate numbering scheme for base layers, in which one or more of the bitstreams (1, 1, 1) through (m, n, O) refers to a base layer.

Figure 10:
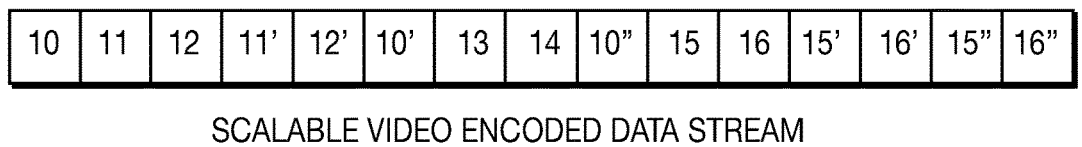
FIG. 10 is a block view of an example of a data stream generated by the implementation of FIG. 9.

Referring to FIG. 10, a block view is provided of a data stream 1000 generated by the implementation of FIGS. 8 and 9. FIG. 10 illustrates the transmission of the following layers:

Layer (1, 1, 1): spatial level 1, temporal level 1, quality level 1; which includes transmission of blocks 10, 11, and 12;

Layer (1, 2, 1): spatial level 1, temporal level 2, quality level 1; which includes the additional transmission of blocks 11' and 12';

Layer (2, 1, 1): spatial level 2, temporal level 1, quality level 1; which includes the additional transmission of blocks 10', 13, and 14;

Layer (3, 1, 1) spatial level 3, temporal level 1, quality level 1; which includes the additional transmission of blocks 10", 15, and 16;

Layer (3, 2, 1): spatial level 3, temporal level 2, quality level 1; which includes the additional transmission of blocks 15' and 16';

Layer (3, 3, 1): spatial level 3, temporal level 3, quality level 1; which includes the additional transmission of blocks 15" and 16".

The block view of the data stream 1000 illustrates that SPS 10 is only sent once and is used by both Layer (1, 1, 1) and Layer (1, 2, 1), and that SPS 10" is only sent once is used each of Layer (3, 1, 1), Layer (3, 2, 1), and Layer (3, 3, 1).

Further, the data stream 1000 illustrates that the parameters for all of the layers are not transmitted, but rather only the parameters corresponding to the transmitted layers. For example, the parameters for layer (2, 2, 1), corresponding to SUP_SPS$_2{}^2$, are not transmitted because that layer is not transmitted. This provides an efficiency for this implementation.

Figure 11:
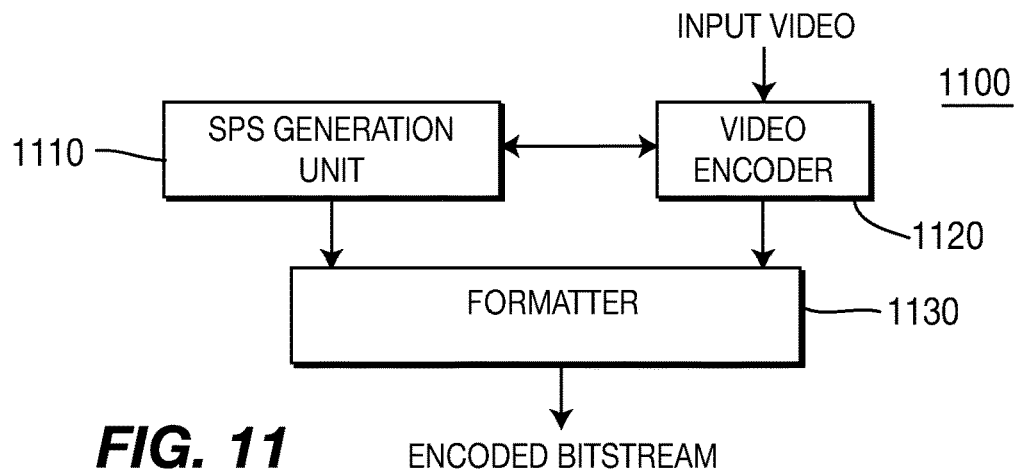
FIG. 11 is a block diagram of an implementation of an encoder.

Referring to FIG. 11, an encoder 1100 includes an SPS generation unit 1110, a video encoder 1120, and a formatter 1130. The video encoder 1120 receives input video, encodes the input video, and provides the encoded input video to the formatter 1130. The encoded input video may include, for example, multiple layers such as, for example, an encoded base layer and an encoded enhancement layer. The SPS generation unit 1110 generates header information, such as, for example, SPS units and SUP SPS units, and provides the header information to the formatter 1130. The SPS generation unit 1110 also communicates with the video encoder 1120 to provide parameters used by the video encoder 1120 in encoding the input video.

The SPS generation unit 1110 may be configured, for example, to generate an SPS NAL unit. The SPS NAL unit may include information that describes a parameter for use in decoding a first-layer encoding of a sequence of images. The SPS generation unit 1110 also may be configured, for example, to generate a SUP SPS NAL unit having a different structure than the SPS NAL unit. The SUP SPS NAL unit may include information that describes a parameter for use in decoding a second-layer encoding of the sequence of images. The first-layer encoding and the second-layer encoding may be produced by the video encoder 1120.

The formatter 1130 multiplexes the encoded video from the video encoder 1120, and the header information from the SPS generation unit 1110, to produce an output encoded bitstream. The encoded bitstream may be a set of data that includes the first-layer encoding of the sequence of images, the second-layer encoding of the sequence of images, the SPS NAL unit, and the SUP SPS NAL unit.

The components 1110, 1120, and 1130 of the encoder 1100 may take many forms. One or more of the components 1110, 1120, and 1130 may include hardware, software, firmware, or a combination, and may be operated from a variety of platforms, such as, for example, a dedicated encoder or a general processor configured through software to function as an encoder.

FIGS. 8 and 11 may be compared. The SPS generation unit 1110 may generate the SPS and the various SUP_SPS$_{n*o}{}^m$ shown in FIG. 8. The video encoder 1120 may generate the bitstreams 7, 7', and 7" (which are the encodings of the input video) shown in FIG. 8. The video encoder 1120 may correspond, for example, to one or more of the encoders 2, 2', or 2". The formatter 1130 may generate the hierarchically arranged data shown by reference numerals 8, 8', 8", as well as perform the operation of the multiplexer 9 to generate the SVC bitstream of FIG. 8.

FIGS. 1 and 11 also may be compared. The video encoder 1120 may correspond, for example, to blocks 104 and 187 of FIG. 1. The formatter 1130 may correspond, for example, to the multiplexer 170. The SPS generation unit 1110 is not explicitly shown in FIG. 1 although the functionality of the SPS generation unit 1110 may be performed, for example, by the multiplexer 170.

Other implementations of encoder 1100 do not include the video encoder 1120 because, for example, the data is pre-encoded. The encoder 1100 also may provide additional outputs and provide additional communication between the components. The encoder 1100 also may be modified to provide additional components which may, for example, be located between existing components.

Figure 12:
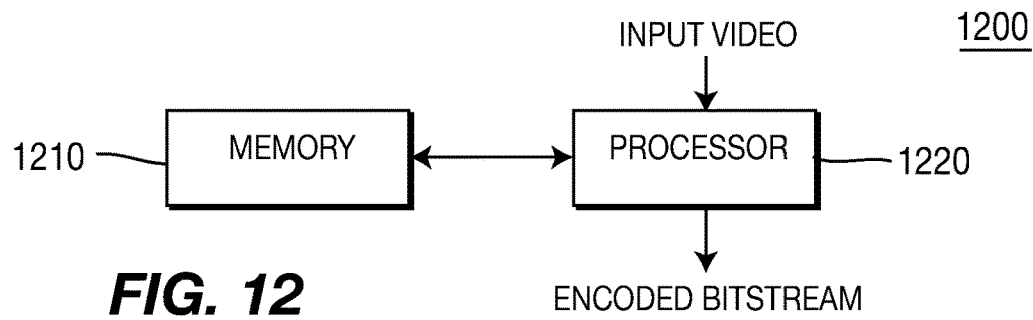
FIG. 12 is a block diagram of another implementation of an encoder.

Referring to FIG. 12, an encoder 1200 is shown that operates in the same manner as the encoder 1100. The encoder 1200 includes a memory 1210 in communication with a processor 1220. The memory 1210 may be used, for example, to store the input video, to store encoding or decoding parameters, to store intermediate or final results during the encoding process, or to store instructions for performing an encoding method. Such storage may be temporary or permanent.

The processor 1220 receives input video and encodes the input video. The processor 1220 also generates header information, and formats an encoded bitstream that includes header information and encoded input video. As in the encoder 1100, the header information provided by the processor 1220 may include separate structures for conveying header information for multiple layers. The processor 1220 may operate according to instructions stored on, or otherwise resident on or part of, for example, the processor 1220 or the memory 1210.

Figure 13:
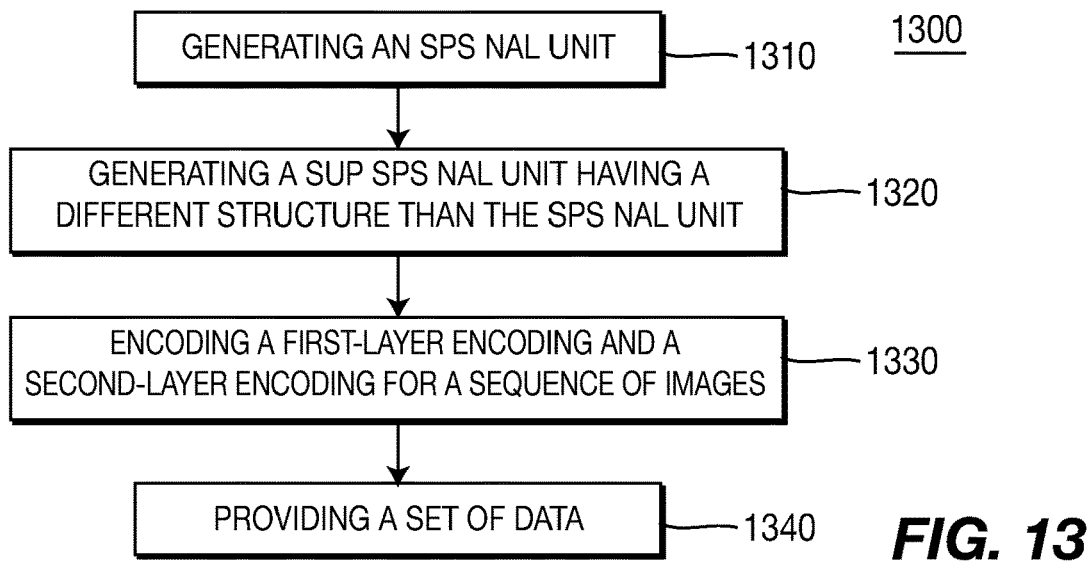
FIG. 13 is a flow chart of an implementation of an encoding process used by the encoders of FIG. 11 or 12.

Referring to FIG. 13, a process 1300 is shown for encoding input video. The process 1300 may be performed by, for example, either of the encoders 1100 or 1200.

The process 1300 includes generating an SPS NAL unit (1310). The SPS NAL unit includes information that describes a parameter for use in decoding the first-layer encoding of the sequence of images. The SPS NAL unit may be defined by a coding standard or not. If the SPS NAL unit is defined by a coding standard, then the coding standard may require a decoder to operate in accordance with received SPS NAL units. Such a requirement is generally referred to by stating that the SPS NAL unit is "normative". SPS, for example, are normative in the AVC standard, whereas supplemental enhancement information ("SEI") messages, for example, are not normative. Accordingly, AVC-compatible decoders may ignore received SEI messages but must operate in accordance with received SPS.

The SPS NAL unit includes information describing one or more parameters for decoding a first layer. The parameter may be, for example, information that is layer-dependent, or is not layer-dependent. Examples of parameters that are typically layer-dependent include a VUI parameter or an HRD parameter.

Operation 1310 may be performed, for example, by the SPS generation unit 1110, the processor 1220, or the SPS and PPS Inserter 2140. The operation 1310 also may correspond to the generation of SPS in any of blocks 5, 5', 5" in FIG. 8.

Accordingly, a means for performing the operation 1310, that is, generating an SPS NAL unit, may include various components. For example, such means may include a module for generating SPS 5, 5', or 5", an entire encoder system of FIG. 1, 8, 11, or 12, an SPS generation unit 1110, a processor 1220, or an SPS and PPS Inserter 2140, or their equivalents including known and future-developed encoders.

The process 1300 includes generating a supplemental ("SUP") SPS NAL unit having a different structure than the SPS NAL unit (1320). The SUP SPS NAL unit includes information that describes a parameter for use in decoding the second-layer encoding of the sequence of images. The SUP SPS NAL unit may be defined by a coding standard, or not. If the SUP SPS NAL unit is defined by a coding standard, then the coding standard may require a decoder to operate in accordance with received SUP SPS NAL units. As discussed above with respect to operation 1310, such a requirement is generally referred to by stating that the SUP SPS NAL unit is "normative".

Various implementations include normative SUP SPS messages. For example, SUP SPS messages may be normative for decoders that decode more than one layer (for example, SVC-compatible decoders). Such multi-layer decoders (for example, SVC-compatible decoders) would be required to operate in accordance with the information conveyed in SUP SPS messages. However, single-layer decoders (for example, AVC-compatible decoders) could ignore SUP SPS messages. As another example, SUP SPS messages may be normative for all decoders, including single-layer and multi-layer decoders. It is not surprising that many implementations include normative SUP SPS messages, given that SUP SPS messages are based in large part on SPS messages, and that SPS messages are normative in the AVC standard and the SVC and MVC extensions. That is, SUP SPS messages carry similar data as SPS messages, serve a similar purpose as SPS messages, and may be considered to be a type of SPS message. It should be clear that implementations having normative SUP SPS messages may provide compatibility advantages, for example, allowing AVC and SVC decoders to receive a common data stream.

The SUP SPS NAL unit (also referred to as the SUP SPS message) includes one or more parameters for decoding a second layer. The parameter may be, for example, information that is layer-dependent, or is not layer-dependent. Specific examples include a VUI parameter or an HRD parameter. The SUP SPS may also be used for decoding the first layer, in addition to being used for decoding the second layer.

Operation 1320 may be performed, for example, by the SPS generation unit 1110, the processor 1220, or a module analogous to the SPS and PPS Inserter 2140. The operation 1320 also may correspond to the generation of SUP_SPS in any of blocks 6, 6', 6" in FIG. 8.

Accordingly, a means for performing the operation 1320, that is, generating a SUP SPS NAL unit, may include various components. For example, such means may include a module for generating SUP_SPS 6, 6', or 6", an entire encoder system of FIG. 1, 8, 11, or 12, an SPS generation unit 1110, a processor 1220, or a module analogous to the SPS and PPS Inserter 2140, or their equivalents including known and future-developed encoders.

The process 1300 includes encoding a first-layer encoding, such as, for example, the base layer, for a sequence of images, and encoding a second-layer encoding for the sequence of images (1330). These encodings of the sequence of images produce the first-layer encoding and the second-layer encoding. The first-layer encoding may be formatted into a series of units referred to as first-layer encoding units, and the second-layer encoding may be formatted into a series of nits referred to as second-layer encoding units. The operation 1330 may be performed, for example, by the video encoder 1120, the processor 1220, the encoders 2, 2', or 2" of FIG. 8, or the implementation of FIG. 1.

Accordingly, a means for performing the operation 1330, may include various components. For example, such means may include an encoder 2, 2', or 2", an entire encoder system of FIG. 1, 8, 11, or 12, a video encoder 1120, a processor 1220, or one or more core encoders 187 (possibly including decimation module 104), or their equivalents including known and future-developed encoders.

The process 1300 includes providing a set of data (1340). The set of data includes the first-layer encoding of the sequence of images, the second-layer encoding of the sequence of images, the SPS NAL unit, and the SUP SPS NAL unit. The set of data may be, for example, a bitstream, encoded according to a known standard, to be stored in memory or transmitted to one or more decoders. Operation 1340 may be performed, for example, by the formatter 1130, the processor 1220, or the multiplexer 170 of FIG. 1. Operation 1340 may also be performed in FIG. 8 by the generation of any of the bitstreams 8, 8', and 8", as well as the generation of the multiplexed SVC bitstream.

Accordingly, a means for performing the operation 1340, that is, providing a set of data, may include various components. For example, such means may include a module for generating the bitstream 8, 8', or 8", a multiplexer 9, an entire encoder system of FIG. 1, 8, 11, or 12, a formatter 1130, a processor 1220, or a multiplexer 170, or their equivalents including known and future-developed encoders.

The process 1300 may be modified in various ways. For example, operation 1330 may be removed from the process 1300 in implementations in which, for example, the data is pre-encoded. Further, in addition to removing operation 1330, operation 1340 may be removed to provide a process directed toward generating description units for multiple layers.

Referring to FIG. 14, a data stream 1400 is shown that may be generated, for example, by the process 1300. The data stream 1400 includes a portion 1410 for an SPS NAL unit, a portion 1420 for a SUP SPS NAL unit, a portion 1430 for the first-layer encoded data, and a portion 1440 for the second-layer encoded data. The first-layer encoded data 1430 is the first-layer encoding, which may be formatted as first-layer encoding units. The second-layer encoded data 1440 is the second-layer encoding, which may be formatted as second-layer encoding units. The data stream 1400 may include additional portions which may be appended after the portion 1440 or interspersed between the portions 1410-1440. Additionally, other implementations may modify one or more of the portions 1410-1440.

The data stream 1400 may be compared to FIGS. 9 and 10. The SPS NAL unit 1410 may be, for example, any of the SPS1 10, the SPS2 10', or the SPSm 10". The SUP SPS NAL unit 1420 may be, for example, any of the SUP_SPS headers 11, 11', 11", 13, 13', 13", 15, 15', or 15". The first-layer encoded data 1430 and the second-layer encoded data 1440 may be any of the bitstreams for the individual layers shown as Bitstream of Layer (1, 1, 1) 12 through (m, n, O) 16", and including the bitstreams 12, 12', 12", 14, 14', 14", 16, 16', and 16". It is possible for the first-layer encoded data 1430 to be a bitstream with a higher set of levels than the second-layer encoded data 1440. For example, the first-layer encoded data 1430 may be the Bitstream of Layer (2, 2, 1) 14', and the second-layer encoded data 1440 may be the Bitstream of Layer (1, 1, 1) 12.

An implementation of the data stream 1400 may also correspond to the data stream 1000. The SPS NAL unit 1410 may correspond to the SPS module 10 of the data stream 1000. The SUP SPS NAL unit 1420 may correspond to the SUP_SPS module 11 of the data stream 1000. The first-layer encoded data 1430 may correspond to the Bitstream of Layer (1, 1, 1) 12 of the data stream 1000. The second-layer encoded data 1440 may correspond to the Bitstream of Layer (1, 2, 1) 12' of the data stream 1000. The SUP_SPS module 11' of the data stream 1000 may be interspersed between the first-layer encoded data 1430 and the second-layer encoded data 1440. The remaining blocks (10'-16")

shown in the data stream 1000 may be appended to the data stream 1400 in the same order shown in the data stream 1000.

FIGS. 9 and 10 may suggest that the SPS modules do not include any layer-specific parameters. Various implementations do operate in this manner, and typically require a SUP_SPS for each layer. However, other implementations allow the SPS to include layer-specific parameters for one or more layers, thus allowing one or more layers to be transmitted without requiring a SUP_SPS.

FIGS. 9 and 10 suggest that each spatial level has its own SPS. Other implementations vary this feature. For example, other implementations provide a separate SPS for each temporal level, or for each quality level. Still other implementations provide a separate SPS for each layer, and other implementations provide a single SPS that serves all layers.

Referring to FIG. 15, a decoder 1500 includes a parsing unit 1510 that receives an encoded bitstream, such as, for example, the encoded bitstream provided by the encoder 1100, the encoder 1200, the process 1300, or the data stream 1400. The parsing unit 1510 is coupled to a decoder 1520.

The parsing unit 1510 is configured to access information from an SPS NAL unit. The information from the SPS NAL unit describes a parameter for use in decoding a first-layer encoding of a sequence of images. The parsing unit 1510 is further configured to access information from a SUP SPS NAL unit having a different structure than the SPS NAL unit. The information from the SUP SPS NAL unit describes a parameter for use in decoding a second-layer encoding of the sequence of images. As described above in conjunction with FIG. 13, the parameters may be layer-dependent or non-layer-dependent.

The parsing unit 1510 provides parsed header data as an output. The header data includes the information accessed from the SPS NAL unit and also includes the information accessed from the SUP SPS NAL unit. The parsing unit 1510 also provides parsed encoded video data as an output. The encoded video data includes the first-layer encoding and the second-layer encoding. Both the header data and the encoded video data are provided to the decoder 1520.

The decoder 1520 decodes the first-layer encoding using the information accessed from the SPS NAL unit. The decoder 1520 also decodes the second-layer encoding using the information accessed from the SUP SPS NAL unit. The decoder 1520 further generates a reconstruction of the sequence of images based on the decoded first-layer and/or the decoded second-layer. The decoder 1520 provides a reconstructed video as an output. The reconstructed video may be, for example, a reconstruction of the first-layer encoding or a reconstruction of the second-layer encoding.

Comparing FIGS. 15, 2, and 2*a*, the parsing unit 1510 may correspond, for example, to the demultiplexer 202, and/or one or more of the entropy decoders 204, 212, 222, or 2245, in some implementations. The decoder 1520 may correspond, for example, to the remaining blocks in FIG. 2.

The decoder 1500 also may provide additional outputs and provide additional communication between the components. The decoder 1500 also may be modified to provide additional components which may, for example, be located between existing components.

The components 1510 and 1520 of the decoder 1500 may take many forms. One or more of the components 1510 and 1520 may include hardware, software, firmware, or a combination, and may be operated from a variety of platforms, such as, for example, a dedicated decoder or a general processor configured through software to function as a decoder.

Referring to FIG. 16, a decoder 1600 is shown that operates in the same manner as the decoder 1500. The decoder 1600 includes a memory 1610 in communication with a processor 1620. The memory 1610 may be used, for example, to store the input encoded bitstream, to store decoding or encoding parameters, to store intermediate or final results during the decoding process, or to store instructions for performing a decoding method. Such storage may be temporary or permanent.

The processor 1620 receives an encoded bitstream and decodes the encoded bitstream into a reconstructed video. The encoded bitstream includes, for example, (1) a first-layer encoding of a sequence of images, (2) a second-layer encoding of the sequence of images, (3) an SPS NAL unit having information that describes a parameter for use in decoding the first-layer encoding, and (4) a SUP SPS NAL unit having a different structure than the SPS NAL unit, and having information that describes a parameter for use in decoding the second-layer encoding.

The processor 1620 produces the reconstructed video based on at least the first-layer encoding, the second-layer encoding, the information from the SPS NAL unit, and the information from the SUP SPS NAL unit. The reconstructed video may be, for example, a reconstruction of the first-layer encoding or a reconstruction of the second-layer encoding. The processor 1620 may operate according to instructions stored on, or otherwise resident on or part of, for example, the processor 1620 or the memory 1610.

Referring to FIG. 17, a process 1700 is shown for decoding an encoded bitstream. The process 1700 may be performed by, for example, either of the decoders 1500 or 1600.

The process 1700 includes accessing information from an SPS NAL unit (1710). The accessed information describes a parameter for use in decoding a first-layer encoding of a sequence of images.

The SPS NAL unit may be as described earlier with respect to FIG. 13. Further, the accessed information may be, for example, an HRD parameter. Operation 1710 may be performed, for example, by the parsing unit 1510, the processor 1620, an entropy decoder 204, 212, 222, or 2245, or decoder control 2205. Operation 1710 also may be performed in a reconstruction process at an encoder by one or more components of an encoder.

Accordingly, a means for performing the operation 1710, that is, accessing information from an SPS NAL unit, may include various components. For example, such means may include a parsing unit 1510, a processor 1620, a single-layer decoder, an entire decoder system of FIG. 2, 15, or 16, or one or more components of a decoder, or one or more components of encoders 800, 1100, or 1200, or their equivalents including known and future-developed decoders and encoders.

The process 1700 includes accessing information from a SUP SPS NAL unit having a different structure than the SPS NAL unit (1720). The information accessed from the SUP SPS NAL unit describes a parameter for use in decoding a second-layer encoding of the sequence of images.

The SUP SPS NAL unit may be as described earlier with respect to FIG. 13. Further, the accessed information may be, for example, an HRD parameter. Operation 1720 may be performed, for example, by the parsing unit 1510, the processor 1620, an entropy decoder 204, 212, 222, or 2245, or decoder control 2205. Operation 1720 also may be performed in a reconstruction process at an encoder by one or more components of an encoder.

Accordingly, a means for performing the operation 1720, that is, accessing information from a SUP SPS NAL unit, may include various components. For example, such means may include a parsing unit 1510, a processor 1620, a demultiplexer 202, an entropy decoder 204, 212, or 222, a single-layer decoder, or an entire decoder system 200, 1500, or 1600, or one or more components of a decoder, or one or more components of encoders 800, 1100, or 1200, or their equivalents including known and future-developed decoders and encoders.

The process 1700 includes accessing a first-layer encoding and a second-layer encoding for the sequence of images (1730). The first-layer encoding may have been formatted into first-layer encoding units, and the second-layer encoding may have been formatted into second-layer encoding units. Operation 1730 may be performed, for example, by the parsing unit 1510, the decoder 1520, the processor 1620, an entropy decoder 204, 212, 222, or 2245, or various other blocks downstream of the entropy decoders. Operation 1730 also may be performed in a reconstruction process at an encoder by one or more components of an encoder.

Accordingly, a means for performing the operation 1730 may include various components. For example, such means may include a parsing unit 1510, a decoder 1520, a processor 1620, A demultiplexer 202, an entropy decoder 204, 212, or 222, a single-layer decoder, a bitstream receiver, a receiving device, or an entire decoder system 200, 1500, or 1600, or one or more components of a decoder, or one or more components of encoders 800, 1100, or 1200, or their equivalents including known and future-developed decoders and encoders.

The process 1700 includes generating a decoding of the sequence of images (1740). The decoding of the sequence of images may be based on the first-layer encoding, the second-layer encoding, the accessed information from the SPS NAL unit, and the accessed information from the SUP SPS NAL unit. Operation 1740 may be performed, for example, by the decoder 1520, the processor 1620, or various blocks downstream of demultiplexer 202 and input buffer 2210. Operation 1740 also may be performed in a reconstruction process at an encoder by one or more components of an encoder.

Accordingly, a means for performing the operation 1740 may include various components. For example, such means may include a decoder 1530, a processor 1620, a single-layer decoder, an entire decoder system 200, 1500, or 1600, or one or more components of a decoder, an encoder performing a reconstruction, or one or more components of encoders 800, 1100, or 1200, or their equivalents including known and future-developed decoders or encoders.

Another implementation performs an encoding method that includes accessing first layer-dependent information in a first normative parameter set. The accessed first layer-dependent information is for use in decoding a first-layer encoding of a sequence of images. The first normative parameter set may be, for example, an SPS that includes HRD-related parameters or other layer-dependent information. However, the first normative parameter set need not be an SPS and need not be related to an H.264 standard.

In addition to the first parameter set being normative, which requires a decoder to operate in accordance with the first parameter set if such a parameter set is received, the first parameter set may also be required to be received in an implementation. That is, an implementation may further require that the first parameter set be provided to a decoder.

The encoding method of this implementation further includes accessing second layer-dependent information in a second normative parameter set. The second normative parameter set has a different structure than the first normative parameter set. Also, the accessed second layer-dependent information is for use in decoding a second-layer encoding of the sequence of images. The second normative parameter set may be, for example, a supplemental SPS. The supplemental SPS has a structure that is different from, for example, an SPS. The supplemental SPS also includes HRD parameters or other layer-dependent information for a second layer (different from the first layer).

The encoding method of this implementation further includes decoding the sequence of images based on one or more of the accessed first layer-dependent information or the accessed second layer-dependent information. This may include, for example, decoding a base layer or an enhancement layer.

Corresponding apparatuses are also provided in other implementations, for implementing the encoding method of this implementation. Such apparatuses include, for example, programmed encoders, programmed processors, hardware implementations, or processor-readable media having instructions for performing the encoding method. The systems 1100 and 1200, for example, may implement the encoding method of this implementation.

Corresponding signals, and media storing such signals or the data of such signals, are also provided. Such signals are produced, for example, by an encoder that performs the encoding method of this implementation.

Another implementation performs a decoding method analogous to the above encoding method. The decoding method includes generating a first normative parameter set that includes first layer-dependent information. The first layer-dependent information is for use in decoding a first-layer encoding of a sequence of images. The decoding method also includes generating a second normative parameter set having a different structure than the first normative parameter set. The second normative parameter set includes second layer-dependent information for use in decoding a second-layer encoding of the sequence of images. The decoding method further includes providing a set of data including the first normative parameter set and the second normative parameter set.

Corresponding apparatuses are also provided in other implementations, for implementing the above decoding method of this implementation. Such apparatuses include, for example, programmed decoders, programmed processors, hardware implementations, or processor-readable media having instructions for performing the decoding method. The systems 1500 and 1600, for example, may implement the decoding method of this implementation.

Note that the term "supplemental", as used above, for example, in referring to "supplemental SPS" is a descriptive term. As such, "supplemental SPS" does not preclude units that do not include the term "supplemental" in the unit name. Accordingly, and by way of example, a current draft of the SVC extension defines a "subset SPS" syntax structure, and the "subset SPS" syntax structure is fully encompassed by the descriptive term "supplemental". So that the "subset SPS" of the current SVC extension is one implementation of a SUP SPS as described in this disclosure.

Implementations may use other types of messages in addition to, or as a replacement for, the SPS NAL units and/or the SUP SPS NAL units. For example, at least one implementations generates, transmits, receives, accesses, and parses other parameter sets having layer-dependent information.

Further, although SPS and supplemental SPS have been discussed largely in the context of H.264 standards, other standards also may include SPS, supplemental SPS, or variations of SPS or supplemental SPS. Accordingly, other standards (existing or future-developed) may include structures referred to as SPS or supplemental SPS, and such structures may be identical to or be variations of the SPS and supplemental SPS described herein. Such other standards may, for example, be related to current H.264 standards (for example, an amendment to an existing H.264 standard), or be completely new standards. Alternatively, other standards (existing or future-developed) may include structures that are not referred to as SPS or supplemental SPS, but such structures may be identical to, analogous to, or variations of the SPS or supplemental SPS described herein.

Note that a parameter set is a set of data including parameters. For example, an SPS, a PPS, or a supplemental SPS.

In various implementations, data is said to be "accessed". "Accessing" data may include, for example, receiving, storing, transmitting, or processing data.

Various implementations are provided and described. These implementations can be used to solve a variety of problems. One such problem arises when multiple interoperability points (IOPs) (also referred to as layers) need different values for parameters that are typically carried in the SPS. There is no adequate method to transmit the layer dependent syntax elements in the SPS for different layers having the same SPS identifier. It is problematic to send separate SPS data for each such layer. For example, in many existing systems a base layer and its composite temporal layers share the same SPS identifier.

Several implementations provide a different NAL unit type for supplemental SPS data. Thus, multiple NAL units may be sent, and each NAL unit may include supplemental SPS information for a different SVC layer, but each NAL unit may be identified by the same NAL unit type. The supplemental SPS information may, in one implementation, be provided in the "subset SPS" NAL unit type of the current SVC extension.

It should be clear that the implementations described in this disclosure are not restricted to the SVC extension or to any other standard. The concepts and features of the disclosed implementations may be used with other standards that exist now or are developed in the future, or may be used in systems that do not adhere to any standard. As one example, the concepts and features disclosed herein may be used for implementations that work in the environment of the MVC extension. For example, MVC views may need different SPS information, or SVC layers supported within the MVC extension may need different SPS information. Additionally, features and aspects of described implementations may also be adapted for yet other implementations. Accordingly, although implementations described herein may be described in the context SPS for SVC layers, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a computer readable medium having instructions for carrying out a process.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

What is claimed is:
1. A machine implemented method comprising:
generating a sequence parameter set ("SPS") network abstraction layer ("NAL") unit, the SPS NAL unit including information describing a parameter for use in decoding a first layer encoding of one or more images in a sequence of images;

generating a supplemental SPS NAL unit, the supplemental SPS NAL having an available NAL unit type code that is a different NAL unit type code from that of the SPS NAL unit, the supplemental SPS NAL unit having information that describes a parameter for use in decoding a second layer encoding of the one or more image in the sequence of images, and wherein the supplemental SPS NAL unit comprises hypothetical reference decoder (HRD) parameters;

providing a set of data including the first layer encoding of the one or more images, the second layer encoding of the one or more images, the SPS NAL unit, and the supplemental SPS NAL unit.

2. The method as in claim 1, wherein NAL unit type codes are specified in a coding standard and wherein the supplemental SPS NAL unit comprises video usability information (VUI).

3. The method as in claim 1, wherein the method further comprises:
   encoding the sequence of images to produce the first layer encoding for the sequence of images;
   encoding the sequence of images to produce the second layer encoding for the sequence of images.

4. The method as in claim 1, wherein the providing comprises producing a bitstream to be transmitted.

5. The method as in claim 1, wherein the SPS NAL unit and the supplemental SPS NAL unit have different syntax structures.

6. The method as in claim 1, wherein the first layer encoding has a different spatial resolution than the second layer encoding.

7. The method as in claim 1, wherein the first layer encoding has a different level than the second layer encoding for one or more of: spatial level, quality level, or temporal level.

8. The method as in claim 1, wherein the providing comprises:
   storing the set of data for later transmission or presentation on a display, and wherein the method is performed by one or more encoding systems.

9. A non-transitory machine readable medium storing executable program instructions which when executed by a data processing system cause the data processing system to perform a method comprising:
   generating a sequence parameter set ("SPS") network abstraction layer ("NAL") unit, the SPS NAL unit including information describing a parameter for use in decoding a first layer encoding of one or more images in a sequence of images;
   generating a supplemental SPS NAL unit, the supplemental SPS NAL having an available NAL unit type code that is a different NAL unit type code from that of the SPS NAL unit, the supplemental SPS NAL unit having information that describes a parameter for use in decoding a second layer encoding of the one or more image in the sequence of images, and wherein the supplemental SPS NAL unit comprises hypothetical reference decoder (HRD) parameters;
   providing a set of data including the first layer encoding of the one or more images, the second layer encoding of the one or more images, the SPS NAL unit, and the supplemental SPS NAL unit.

10. The medium as in claim 9, wherein NAL unit type codes are specified in a coding standard and wherein the supplemental SPS NAL unit comprises video usability information (VUI).

11. The medium as in claim 9, wherein the method further comprises:
    encoding the sequence of images to produce the first layer encoding for the sequence of images;
    encoding the sequence of images to produce the second layer encoding for the sequence of images.

12. The medium as in claim 9, wherein the providing comprises producing a bitstream to be transmitted.

13. The medium as in claim 9, wherein the SPS NAL unit and the supplemental SPS NAL unit have different syntax structures.

14. The medium as in claim 9, wherein the first layer encoding has a different spatial resolution than the second layer encoding.

15. The medium as in claim 9, wherein the first layer encoding has a different level than the second layer encoding for one or more of: spatial level, quality level, or temporal level.

16. The medium as in claim 9, wherein the providing comprises: storing the set of data for later transmission or presentation on a display, and wherein the method is performed by one or more encoding systems.

17. A data processing system comprising:
    an encoder to generate a sequence parameter set ("SPS") network abstraction layer ("NAL") unit, the SPS NAL unit including information describing a parameter for use in decoding a first layer encoding of one or more images in a sequence of images;
    the encoder to generate a supplemental SPS NAL unit, the supplemental SPS NAL having an available NAL unit type code that is a different NAL unit type code from that of the SPS NAL unit, the supplemental SPS NAL unit having information that describes a parameter for use in decoding a second layer encoding of the one or more image in the sequence of images, and wherein the supplemental SPS NAL unit comprises hypothetical reference decoder (HRD) parameters;
    a memory storing a set of data including the first layer encoding of the one or more images, the second layer encoding of the one or more images, the SPS NAL unit, and the supplemental SPS NAL unit, the memory coupled to the encoder.

18. The data processing system as in claim 17, wherein NAL unit type codes are specified in a coding standard and wherein the supplemental SPS NAL unit comprises video usability information (VUI).

19. The data processing system as in claim 17 further comprising:
    a transmitter, coupled to the memory, to transmit the set of data to one or more decoders.

* * * * *

UNITED STATES PATENT AND TRADEMARK OFFICE
CERTIFICATE OF CORRECTION

PATENT NO. : 11,412,265 B2  
APPLICATION NO. : 17/087763  
DATED : August 9, 2022  
INVENTOR(S) : Lihua Zhu et al.

Page 1 of 1

It is certified that error appears in the above-identified patent and that said Letters Patent is hereby corrected as shown below:

On the Title Page

Page 2, Column 2, Other Publications, Line 27, Delete "servies"," and insert --services",--.

In the Claims

Column 26, Claim 16, Line 27, after "comprises:", insert --¶--.

Signed and Sealed this  
Seventeenth Day of December, 2024

Derrick Brent  
*Acting Director of the United States Patent and Trademark Office*